United States Patent
Fu et al.

(10) Patent No.: US 11,637,659 B2
(45) Date of Patent: Apr. 25, 2023

(54) METHOD AND APPARATUS FOR TRANSMITTING HARQ-ACK FEEDBACK INFORMATION IN AN ENHANCED CARRIER AGGREGATION SYSTEM

(71) Applicant: Samsung Electronics Co., Ltd., Suwon-si (KR)

(72) Inventors: Jingxing Fu, Beijing (CN); Yingyang Li, Beijing (CN); Shichang Zhang, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/555,880

(22) PCT Filed: Apr. 5, 2016

(86) PCT No.: PCT/KR2016/003534
§ 371 (c)(1),
(2) Date: Sep. 5, 2017

(87) PCT Pub. No.: WO2016/163720
PCT Pub. Date: Oct. 13, 2016

(65) Prior Publication Data
US 2018/0054280 A1 Feb. 22, 2018

(30) Foreign Application Priority Data
Apr. 9, 2015 (CN) .......................... 201510165986.2

(51) Int. Cl.
*H04L 1/18* (2006.01)
*H04L 1/1829* (2023.01)
(Continued)

(52) U.S. Cl.
CPC ......... *H04L 1/1861* (2013.01); *H04B 7/0621* (2013.01); *H04B 7/0636* (2013.01);
(Continued)

(58) Field of Classification Search
CPC ... H04L 1/1861; H04L 1/1671; H04L 1/1812; H04L 5/001; H04L 5/0055; H04L 5/1469;
(Continued)

(56) References Cited

U.S. PATENT DOCUMENTS

2010/0272019 A1 10/2010 Papasakellariou et al.
2013/0034073 A1* 2/2013 Aiba ..................... H04L 1/1887
370/329
(Continued)

FOREIGN PATENT DOCUMENTS

EP 2 760 171 A2 7/2014

OTHER PUBLICATIONS

Interdigital Communications; Enabling LTE carrier aggregation of up to 32 component carriers; 3GPP TSG-RAN WGI #80; RI-150537; Feb. 9-13, 2015; Athens, Greece.
(Continued)

*Primary Examiner* — Mandish K Randhawa
(74) *Attorney, Agent, or Firm* — Jefferson IP Law, LLP

(57) ABSTRACT

The present disclosure provides a method for transmitting hybrid automatic repeat-request acknowledgement (HARQ-ACK) feedback information in an enhanced carrier aggregation system. A user equipment (UE) determines the number of HARQ-ACK feedback information bits that the UE needs to transmit in an uplink subframe, and determines the number of uplink control information (UCI) bits to be transmitted in the uplink subframe based on the number of the HARQ-ACK feedback information bits, the number of channel state information (CSI) bits, and the number of scheduling request (SR) bits that need to be transmitted in the uplink subframe, and transmitting the UCI according to the PUCCH format and the resource for transmission of
(Continued)

PUCCH determined. With the present disclosure, UCI information may be transmitted using different formats in different PUCCH formats.

9 Claims, 6 Drawing Sheets

(51) Int. Cl.
    *H04L 5/00*      (2006.01)
    *H04L 5/14*      (2006.01)
    *H04L 1/1607*    (2023.01)
    *H04B 7/06*      (2006.01)
    *H04L 1/1812*    (2023.01)
    *H04W 72/0446*   (2023.01)
    *H04L 1/00*      (2006.01)

(52) U.S. Cl.
    CPC .......... *H04L 1/1671* (2013.01); *H04L 1/1812* (2013.01); *H04L 5/001* (2013.01); *H04L 5/0055* (2013.01); *H04L 5/1469* (2013.01); *H04W 72/0446* (2013.01); *H04L 1/0007* (2013.01); *H04L 5/0053* (2013.01)

(58) Field of Classification Search
    CPC ... H04L 1/0007; H04L 5/0053; H04B 7/0621; H04B 7/0636; H04W 72/0446
    See application file for complete search history.

(56) References Cited

U.S. PATENT DOCUMENTS

| | | | |
|---|---|---|---|
| 2015/0092702 A1 | 4/2015 | Chen et al. | |
| 2015/0245345 A1* | 8/2015 | Gao | H04L 1/1671 370/329 |
| 2016/0007324 A1* | 1/2016 | Lee | H04L 5/0055 370/329 |
| 2018/0007686 A1* | 1/2018 | Lyu | H04L 5/0053 |
| 2018/0027547 A1* | 1/2018 | Lyu | H04L 1/16 370/329 |
| 2018/0115402 A1* | 4/2018 | Takahashi | H04W 52/146 |

OTHER PUBLICATIONS

Huawei et al., 'On CA enhancements supporting up to 32 component carriers', R1-150390, 3GPP TSG RAN WG1 Meeting #80, Feb. 18, 2015, pp. 1-13, Athens, Greece.
Huawei et al., 'CSI feedback enhancement for carrier aggregation enhancement beyond 5 carriers', R1-150412, 3GPP TSG RAN WG1 Meeting #80, Feb. 18, 2015, pp. 1-4, Athens, Greece.
Qualcomm Incorporated, 'HARQ ACK for up to 32 DL Carriers', R1-150472, 3GPP TSG RAN WG1 Meeting #80, Feb. 18, 2015, pp. 1-7, Athens, Greece.
ZTE, 'UCI enhancement for Carrier Aggregation', R1-150138, 3GPP TSG RAN WG1 Meeting #80, Feb. 18, 2015, pp. 1-5, Athens, Greece.
Chinese Office Action dated Oct. 20, 2020, issued in a counterpart Chinese Application No. 201510752710.4.

* cited by examiner

METHOD AND APPARATUS FOR TRANSMITTING HARQ-ACK FEEDBACK INFORMATION IN AN ENHANCED CARRIER AGGREGATION SYSTEM

TECHNICAL FIELD

The present disclosure relates to radio communication systems and in particular to a method and an apparatus for transmitting HARQ-ACK feedback information in an enhanced carrier aggregation system.

BACKGROUND ART

A long term evolution (LTE) system supports two types of duplex: frequency division duplex (FDD) and time division duplex (TDD). FIG. 1 is a frame structure of a TDD system. Each radio frame is 10 ms long, and is equally divided into two half frames having a length of 5 ms each. Each half frame includes 8 timeslots having a length of 0.5 ms each and 3 special fields, i.e., a downlink pilot timeslot (DwPTS), a guard period (GP), and an uplink pilot timeslot (UpPTS). An overall length of the 3 special fields is 1 ms. Each subframe consists of two consecutive timeslots, i.e., subframe k containing timeslot 2k and timeslot 2k+1. The TDD system supports 7 different TDD downlink and uplink configurations, as shown in table 1. In table 1, "D" represents a downlink subframe, "U" represents an uplink subframe, and "S" represents a special subframe containing the 3 special fields.

TABLE 1

| Config-uration | Switch-point Periodicity | Subframe Number |   |   |   |   |   |   |   |   |   |
|---|---|---|---|---|---|---|---|---|---|---|---|
|   |   | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |

LTE TDD Uplink (UL)/Downlink (DL) Configurations

For a TDD system, when the number of downlink subframes is larger than the number of uplink subframes, a hybrid automatic repeat-request acknowledgement (HARQ-ACK) of a physical downlink shared channel (PDSCH) and a downlink semi-persistent scheduling (SPS) release physical downlink control channel (PDCCH)/enhanced physical downlink control channel (EPDCCH) transmitted in multiple downlink subframes is transmitted in an uplink subframe, as shown in FIG. 2. The number of downlink subframes whose HARQ-ACK is transmitted in an uplink subframe is referred to as a HARQ-ACK bundling window size. For a FDD system, the number of downlink subframes whose HARQ-ACK is transmitted in an uplink subframe is 1, i.e., a HARQ-ACK bundling window size of the FDD system is 1.

To improve transmission rates for UEs, a LTE advanced (LTE-A) system is proposed. In the LTE-A system, a relatively large working bandwidth may be obtained by aggregating multiple component carriers (CCs), i.e., carrier aggregation (CA), to construct uplinks and downlinks in a communication system so as to support higher transmission rates. For example, to support a 100 MHz bandwidth, five 20 MHz CCs may be aggregated. Here, each CC is referred to as a cell. For a UE, a base station may configure the UE to work in multiple CCs, and one of the multiple CCs is a primary CC (a PCC or a Pcell), and the others are secondary CCs (SCCs or Scells).

In this kind of CA system, a downlink (DL)-reference uplink/downlink (UL/DL) configuration of a serving cell is determined based on configurations of serving cells with HARQ-ACK transmission configured for UEs and a configuration of the serving cell. Here, the configuration of the serving cell includes FDD and TDD uplink and downlink configurations. Then, according to the determined DL-reference UL/DL configuration, a HARQ-ACK bundling window of the serving cell and a size thereof may be determined.

A way for a UE to transmit HARQ-ACK feedback information is physical uplink control channel (PUCCH) format 3. PUCCH format 3 may support at most 5 cells, and may transmit at most 22 bits of information. These 22 bits may include HARQ-ACK feedback information bits, channel state information (CSI) bits, and scheduling request (SR) bits. A PUCCH format 3 resource for transmission of HARQ-ACK feedback information is dynamically indicated by a HARQ-ACK resource indicator (ARI) contained in a PDCCH/EPDCCH for PDSCH scheduling among a set of PUCCH format 3 resources allocated to the UE by higher layer signaling. The ARI may be implemented by re-interpreting a transmission power control (TPC) field which may include a TPC field in a PDCCH for Scell scheduling and a TPC field in a PDCCH/EPDCCH for Pcell scheduling where a downlink downlink assignment indicator (DL DAI) is not equal to 1. Detailed indicators are as shown in Table 2.

TABLE 2

| PUCCH format 3 resource indicator value | PUCCH format 3 resource configured by higher layer signaling |
|---|---|
| '00' | First PUCCH format 3 resource configured by higher layer signaling |
| '01' | Second PUCCH format 3 resource configured by higher layer signaling |
| '10' | Third PUCCH format 3 resource configured by higher layer signaling |
| '11' | Fourth PUCCH format 3 resource configured by higher layer signaling |

PUCCH Format 3 Resource Indicator

In a traditional CA system, if a UE is configured with PUCCH format 3 to transmit HARQ-ACK feedback information, and the total number of bits of HARQ-ACK feedback information and/or CSI information and/or SR is not larger than 22 bits, then HARQ-ACK feedback information and/or CSI information and/or SR are/is transmitted using a PUCCH; in case spatial bundling is performed for HARQ-ACK feedback information, if the total number of bits of HARQ-ACK feedback information and/or CSI information and/or SR is not larger than 22 bits, then the PUCCH is still used to transmit HARQ-ACK feedback information and/or CSI and/or SR; and if the total number of bits of HARQ-ACK feedback information and/or CSI information and/or SR is still larger than 22 bits, the UE may only transmit HARQ-ACK feedback information and/or SR, but may not transmit CSI information.

To further efficiently use wide frequency spectrum resources which include frequency spectrum resources of license-free frequency bands, a UE may aggregate a carrier aggregation system of more than 5 CCs so as to achieve a larger working bandwidth, e.g., aggregating a carrier aggregation system of up to 32 serving cells.

Since the number of serving cells configured for a UE may be as many as 32, the number of HARQ-ACK bits is far more than 22 bits, and therefore a study has proposed a new PUCCH format to bear HARQ-ACK bits. Hereinafter, the new PUCCH format is referred to as PUCCH format X, and the PUCCH format X may bear as many as N' bits, e.g., N' being equal to 64 or 128. In addition, since so many serving cells are configured for the UE, the number of bits needed to transmit CSI feedback of the serving cells is also relatively large. However, PUCCH formats 2/2a/2b currently used for transmission of CSI are not enough to bear CSI bits of multiple serving cells.

DISCLOSURE OF INVENTION

Technical Problem

A study has proposed a PUCCH format distinct from the PUCCH formats 2/2a/2b to bear CSI bits of multiple serving cells. Hereinafter, this PUCCH format is referred to as PUCCH format Y. The PUCCH format Y may be same as the PUCCH format X, or may be the PUCCH format 3. A PUCCH format Y resource for transmission of CSI is configured to the UE by higher layer signaling. Since the new PUCCH channel formats are introduced, channel allocation and multiplexing problems need to be solved.

Solution to Problem

The present disclosure provides a method and apparatus for transmitting HARQ-ACK feedback information in an enhanced carrier aggregation system to transmit UCI information using different PUCCH formats in different uplink subframes.

To achieve the foregoing object, the solution of the present disclosure is as follows.

A method for transmitting hybrid automatic repeat-request acknowledgement (HARQ-ACK) information in an enhanced carrier aggregation system, includes:

determining, by a user equipment (UE), the number of HARQ-ACK feedback information bits that the UE needs to transmit in an uplink subframe;

determining, by the UE, the number of uplink control information (UCI) bits to be transmitted in the uplink subframe based on the number of the HARQ-ACK feedback information bits, the number of channel state information (CSI) bits, and the number of scheduling request (SR) bits that need to be transmitted in the uplink subframe; and determining, by the UE, a physical uplink control channel (PUCCH) format and a resource for transmission of PUCCH to transmit UCI based on the number of the UCI bits to be transmitted in the uplink subframe, and transmitting the UCI according to the PUCCH format and the resource for transmission of PUCCH determined.

Determining the PUCCH format and the resource for transmission of PUCCH to transmit the UCI based on the number of the UCI bits to be transmitted in the uplink subframe includes:

in response to determining that the number of the UCI bits is smaller than or equal to a preset positive integer M, determining that the PUCCH format to transmit the UCI is a PUCCH format 3, and the resource for transmission of PUCCH is one of a set of resources with the PUCCH format 3 configured for the UE; and in response to determining that the number of the UCI bits is larger than the preset positive integer M, determining that the PUCCH format to transmit the UCI is a PUCCH format X, and the resource for transmission of PUCCH is one of a set of resources with the PUCCH format X configured for the UE; in which the PUCCH format X is a PUCCH format customized for transmission of HARQ-ACK feedback information.

When the UE is not configured with periodic CSI transmission, determining the PUCCH format and the resource for transmission of PUCCH to transmit the UCI includes:

in response to determining that the UE does not have a resource with a PUCCH format 3 or a resource with a PUCCH format X indicated by a HARQ-ACK resource indicator (ARI) in the uplink subframe, using a PUCCH format 1A/1B to transmit the UCI on a resource with the PUCCH format 1A/1B; and in response to determining that the UE has the resource with the PUCCH format 3 and the resource with the PUCCH format X indicated by the ARI in the uplink subframe, and in response to determining that the number of the UCI bits of the UE is smaller than or equal to a preset positive integer m, using the PUCCH format 3 to transmit the UCI on the resource with the PUCCH format 3; or in response to determining that the number of the UCI bits of the UE is larger than m, using the PUCCH format X to transmit the UCI on the resource with the PUCCH format X;

in which the PUCCH format X is a PUCCH format different from the PUCCH format 3.

When the UE is configured with a periodic CSI transmission, without a SR transmission, and the UE does not have a resource with a PUCCH format 3 or a resource with a PUCCH format X indicated by an ARI in the uplink subframe, and determining the PUCCH format and the resource for transmission of PUCCH to transmit the UCI comprises:

in the uplink subframe, in response to determining that the number of the UCI bits is smaller than or equal to a preset positive integer m, in response to determining that the number of periodic CSI bits is smaller than or equal to a preset positive integer n', then using a PUCCH format 2/2A/2B to transmit the UCI on a resource with the PUCCH format 2/2A/2B; and in response to determining that the number of the periodic CSI bits is larger than n' where n' is 11, then using the PUCCH format 3 to transmit the UCI on the resource of the PUCCH format 3; or in response to determining that the periodic CSI transmission is configured only for one serving cell, or that a periodic CSI transmission with one CSI process is configured for one serving cell, then using the PUCCH format 2/2A/2B to transmit the UCI on the resource with the PUCCH format 2/2A/2B; and in response to determining that the periodic CSI transmission is configured for more than one serving cell, or that the periodic CSI transmission with one CSI process is configured for more than one serving cell, then using the PUCCH format 3 to transmit the UCI on the resource with the PUCCH format 3; or in the uplink subframe, in response to determining that the number of the UCI bits is larger than m, using a PUCCH format Y to transmit the UCI on a resource with the PUCCH format Y;

wherein the PUCCH format Y is a customized PUCCH format different from the PUCCH format 3 and the PUCCH format 2/2A/2B.

When the UE is configured with a periodic CSI transmission and a SR transmission, and the UE does not have a resource with a PUCCH format 3 or a resource with a PUCCH format X indicated by an ARI in the uplink subframe, determining the PUCCH format and the resource for transmission of PUCCH to transmit the UCI includes:

in the uplink subframe, in response to determining that the number of the UCI bits is smaller than or equal to a preset positive integer m, in response to determining that the number of periodic CSI bits is smaller than or equal to a preset positive integer n', then not transmitting periodic CSI, but using a PUCCH format 1A/1B to transmit HARQ-ACK and SR information contained in the UCI on a resource with the PUCCH format 1A/1B; or in response to determining that the number of the periodic CSI bits is larger than n', then using the PUCCH format 3 to transmit the UCI on the resource with the PUCCH format 3; or in response to determining that a sum of the number of the periodic CSI bits and the number of the SR bits is smaller than or equal to n', then using a PUCCH format 2/2A/2B to transmit the UCI on a resource with the PUCCH format 2/2A/2B; and in response to determining that the sum of the number of the periodic CSI bits and the number of the SR bits is larger than n', then using the PUCCH format 3 to transmit the UCI on the resource with the PUCCH format 3;

in the uplink subframe, in response to determining that the number of the UCI bits is larger than m, using a PUCCH format Y to transmit the UCI on a resource with the PUCCH format Y;

in which the PUCCH format Y is a PUCCH format different from the PUCCH format 3 and the PUCCH format 2/2A/2B.

When the UE is configured with a periodic CSI transmission and/or a SR transmission, and the UE has a resource with a PUCCH format 3 and a resource with a PUCCH format X indicated by an ARI in the uplink subframe, determining the PUCCH format and the resource for transmission of PUCCH to transmit the UCI includes:

in response to determining that the number of the UCI bits is smaller than or equal to a preset positive integer m, then using the PUCCH format 3 to transmit the UCI on the resource with the PUCCH format 3; and in response to determining that the number of the UCI bits is larger than m, then using the PUCCH format X to transmit the UCI on the resource with the PUCCH format X; or in response to determining that the number of the UCI bits is smaller than or equal to a preset positive integer n', using a PUCCH format 2/2A/2B to transmit the UCI on a resource with the PUCCH format 2/2A/2B; and in response to determining that the number of the UCI bits is larger than n' and is smaller than or equal to m, then using the PUCCH format 3 to transmit the UCI on the resource with the PUCCH format 3; and in response to determining that the number of the UCI bits is larger than m, then using the PUCCH format X to transmit the UCI on the resource with the PUCCH format X;

in which the PUCCH format X is a customized PUCCH format different from the PUCCH format 3.

When the uplink subframe is configured with a resource with a PUCCH format Y, determining the PUCCH format and the resource for transmission of PUCCH to transmit the UCI includes:

the UE only using one of a resource with a PUCCH format 3/PUCCH format X and the resource with the PUCCH format Y to transmit information contained in the UCI, and using the PUCCH format Y and the corresponding resource with the PUCCH format Y to transmit the UCI in priority; in which "/" represents "or?.

Using the PUCCH format Y and the corresponding resource with the PUCCH format Y to transmit the UCI in priority includes:

in response to determining that the number of the UCI bits is smaller than or equal to L, then determining that the PUCCH format to transmit the UCI is the PUCCH format Y, and the resource for transmission of PUCCH is the resource with the PUCCH format Y configured for the UE; or in response to determining that the number of the UCI bits is larger than L, then determining that the PUCCH format to transmit the UCI is a PUCCH format by which the largest number of bits that are borne is the largest among the PUCCH format 3/PUCCH format X and the PUCCH format Y, and the resource for transmission of PUCCH is a resource corresponding to the determined PUCCH format; and in response to determining that the largest numbers of bits that are borne by the PUCCH format 3/PUCCH format X and the PUCCH format Y are same, then determining that the PUCCH format to transmit the UCI is the PUCCH format Y, and the resource for transmission of PUCCH is the resource with the PUCCH format Y configured for the UE;

in response to determining that the largest number of bits that are borne by the determined PUCCH format is smaller than the number of the UCI bits, then dropping all CSI information from the UCI, or dropping a part of CSI information from the UCI until the number of remaining UCI bits is smaller than or equal to the largest number of bits that are borne by the determined PUCCH format, and using the determined PUCCH format and the resource corresponding to the determined PUCCH format to transmit UCI with the part of CSI information being dropped;

in which the PUCCH format Y is a PUCCH format used for transmission of periodic CSI information, and L is the largest number of bits that are borne by the PUCCH format Y, and the PUCCH format X is a customized PUCCH format for transmission of HARQ-ACK feedback information.

When the number of the UCI bits is smaller than or equal to the largest one among the largest numbers of bits that are borne by a PUCCH format 3/a PUCCH format X for transmission of HARQ-ACK feedback information and the PUCCH format 3/a PUCCH format Y for transmission of CSI, determining the PUCCH format and the resource for transmission of PUCCH to transmit the UCI includes:

the UE selecting a PUCCH format by which the largest number of bits that are borne is the smallest from PUCCH formats that are enough to bear the UCI bits among the PUCCH format 3/PUCCH format X for transmission of HARQ-ACK feedback information and the PUCCH format 3/PUCCH format Y for transmission of CSI to transmit the UCI.

When the number of the UCI bits is larger than the largest one of the largest numbers of bits that can be borne by the PUCCH format 3/PUCCH format X for transmission of HARQ-ACK feedback information and the PUCCH format 3/PUCCH format Y for transmission of CSI, determining the PUCCH format and the resource for transmission of PUCCH to transmit the UCI includes:

the UE selecting a PUCCH format by which the largest number of bits that are borne is the largest from the PUCCH formats for transmission of HARQ-ACK feedback information and the PUCCH formats for transmission of CSI, dropping all periodic CSI information, or dropping a part of periodic CSI information until the number of remaining UCI bits is smaller than the largest number of bits that can be borne by the selected PUCCH format, and then the UE selecting PUCCH formats that are enough to bear remaining UCI from the PUCCH formats for transmission of HARQ-ACK feedback information and the PUCCH formats for transmission of CSI, and selecting a PUCCH format by which the largest number of bits that are borne is the smallest to transmit remaining UCI; or if the UE supporting a simultaneous transmission of two PUCCHs, and a system having configured the UE to transmit two PUCCHs simultaneously, then the UE determining to transmit HARQ-ACK and SR information in the UCI on one of the two PUCCH resources, and transmit CSI in the UCI on the other PUCCH resource; if the UE supporting a transmission of one PUCCH which uses the PUCCH resources for transmission of HARQ-ACK feedback information and the PUCCH resources for transmission of periodic CSI at the same time, and meanwhile, the system configuring the UE to support the PUCCH, then, the UE transmitting HARQ-ACK feedback information and periodic CSI on this PUCCH supported; or if the UE not supporting the simultaneous transmission of two PUCCHs, or if the UE supporting the simultaneous transmission of two PUCCHs, but the system having not configured the UE to simultaneously transmit two PUCCHs, or if the UE not supporting the transmission of one PUCCH which uses the PUCCH resources for transmission of HARQ-ACK feedback information and PUCCH resources for transmission of periodic CSI at the same time, or if the UE supports the transmission of one PUCCH which uses the PUCCH resources for transmission of HARQ-ACK feedback information and the PUCCH resources for transmission of periodic CSI at the same time, but the system having not configured the UE to support the transmission of one PUCCH, then the UE selecting a PUCCH format by which the largest number of bits that can be borne is the largest from the PUCCH formats for transmission of HARQ-ACK feedback information and the PUCCH formats for transmission of CSI, dropping all periodic CSI information, or dropping a part of periodic CSI information until the number of remaining UCI bits is smaller than the largest number of bits that are borne by the selected PUCCH format, the UE selecting PUCCH formats that are enough to bear remaining UCI from the PUCCH formats for transmission of HARQ-ACK feedback information and the PUCCH formats for transmission of CSI, and selecting a PUCCH format by which the largest number of bits that are borne is the smallest from the selected PUCCH formats to transmit remaining UCI.

Determining the PUCCH format and the resource for transmission of PUCCH to transmit the UCI includes:

if the UE supporting the simultaneous transmission of two PUCCHs, and the system configuring the UE to simultaneously transmit two PUCCHs, then the UE transmitting HARQ-ACK and SR information on one of the PUCCH resources, and transmit CSI on the other PUCCH resource;

if the UE supporting a transmission of one PUCCH which uses the PUCCH resources for transmission of HARQ-ACK feedback information and the PUCCH resources for transmission of periodic CSI at the same time, and the system configuring the UE to support the PUCCH, then the UE transmitting HARQ-ACK and SR information on the one PUCCH;

if the UE not supporting the simultaneous transmission of two PUCCHs, or the UE supporting the simultaneous transmission of two PUCCHs, but the system having not configured the UE to simultaneously transmit two PUCCHs, or if the UE not supporting the transmission of one PUCCH which uses the PUCCH resources for transmission of HARQ-ACK feedback information and the PUCCH resources for transmission of periodic CSI at the same time, or if the UE supporting the transmission of one PUCCH which uses the PUCCH resources for transmission of HARQ-ACK feedback information and the PUCCH resources for transmission of periodic CSI at the same time, but the system having not configured the UE to support the transmission of the PUCCH, then the UE selecting a PUCCH format by which the largest number of bits that are borne is the largest from the PUCCH formats for transmission of HARQ-ACK feedback information and the PUCCH formats for transmission of CSI, dropping all periodic CSI, or dropping a part of periodic CSI until the number of remaining UCI bits is smaller than the largest number of bits that are borne by the selected PUCCH format, the UE selecting PUCCH formats that are enough to bear remaining UCI from the PUCCH formats for transmission of HARQ-ACK feedback information and the PUCCH formats for transmission of CSI, and selecting a PUCCH format by which the largest number of bits that are borne is the smallest from the selected PUCCH formats to transmit remaining UCI.

Determining the PUCCH format and the resource for transmission of PUCCH to transmit the UCI comprises:

if the power of the UE is not restricted, the UE supports the simultaneous transmission of two PUCCHs, and higher layer signaling configures the UE to transmit two PUCCHs at the same time, then the UE transmits HARQ-ACK and SR information on one of the PUCCH resources and transmit CSI information on the other PUCCH source;

if the power of the UE is not restricted, the UE supports the transmission of one PUCCH which uses the PUCCH resources for transmission of HARQ-ACK feedback information and the PUCCH resources for transmission of periodic CSI at the same time, and higher layer signaling configures the UE to support the transmission of one PUCCH, then the UE transmits HARQ-ACK and periodic CSI information on this supported PUCCH; and if the power of the UE is not restricted and the UE does not support the simultaneous transmission of two PUCCHs, or if the power of the UE is not restricted, the UE supports the simultaneous transmission of two PUCCHs, but higher layer signaling has not configured the UE to transmit two PUCCHs at the same time, or if the power of the UE is not restricted, and the UE does not support the transmission of one PUCCH which uses the PUCCH resources for transmission of HARQ-ACK feedback information and the PUCCH resources for transmission of periodic CSI at the same time, or if the power of the UE is not restricted, the UE supports the transmission of one PUCCH which uses the PUCCH resources for transmission of HARQ-ACK feedback information and the PUCCH resources for transmission of periodic CSI at the same time, but higher layer signaling has not configured the UE to support the transmission of the PUCCH, or if the power of the UE is restricted, then the UE selects a PUCCH format by which the largest number of bits that can be borne is the largest from the PUCCH formats for transmission of HARQ-ACK feedback information and the PUCCH formats for transmission of periodic CSI, and drops all periodic CSI information or a part of periodic CSI information until the number of remaining UCI bits is smaller than the largest number of bits that can be borne by the selected PUCCH format. Then the UE selects PUCCH formats that are enough to bear remaining UCI from the PUCCH formats for transmission of HARQ-ACK feedback information and the PUCCH formats for transmission of CSI, and selects a PUCCH format by which the largest number of bits that can be borne is the smallest from the selected PUCCH formats to transmit remaining UCI.

The UE is configured with a resource with a PUCCH format 1/1a/1b for transmission of HARQ-ACK/SR feedback information and is not configured with a resource with a PUCCH format 3 or PUCCH format X indicated by an ARI, and then in response to determining that the UE is configured with transmission of one or more periodic CSIs in the uplink subframe, determining the PUCCH format and the resource for transmission of PUCCH to transmit the UCI includes:

using a PUCCH resource for transmission of multiple periodic CSIs configured for the UE to transmit the UCI.

The UE is configured with a resource with a PUCCH format 1/1a/1b for transmission of HARQ-ACK/SR information, and is not configured with a resource with a PUCCH format 3 or a resource with a PUCCH format X indicated by an ARI in the uplink subframe, then in response to determining that the UE is configured with a periodic CSI transmission in the uplink subframe, determining the PUCCH format and the resource for transmission of PUCCH includes: in response to determining that only HARQ-ACK of a scheduled physical downlink shared channel (PDSCH) where a downlink assignment index (DAI) is equal to 1 and/or a semi-persistent scheduling (SPS) downlink transmission of a primary cell (Pcell) need to be transmitted, and that no SR transmission is configured in the uplink subframe, using a resource with a PUCCH format 2a/2b for transmission of periodic CSI configured for the UE to transmit the UCI; and in response to determining that there is not the resource with the PUCCH format 3 or the resource with the PUCCH format X indicated by the ARI in the uplink subframe, and the uplink subframe is configured with the SR transmission, then using the resource with the PUCCH format 1/1a/1b to transmit HARQ-ACK/SR information, and not transmitting periodic CSI; and in response to determining that the UE is configured with multiple periodic CSI transmissions in the uplink subframe, determining the PUCCH format and the resource for transmission of PUCCH to transmit the UCI comprises: using a PUCCH resource for transmission of multiple periodic CSIs configured for the UE to transmit the UCI.

Using the PUCCH resource for transmission of multiple periodic CSIs configured for the UE to transmit the UCI comprises:

in response to determining that there are two PUCCH resources for transmission of multiple periodic CSIs configured for the UE, selecting one of the two PUCCH resources to transmit the UCI according to the number of the UCI bits; in which a method for selecting one of the two PUCCH resources comprises: in response to determining that the largest numbers of bits that are transmitted by the two PUCCH resources are both larger than the number of the UCI bits, then selecting a PUCCH resource of which the largest number of bits is larger from the two PUCCH resources; in response to determining that the largest number of bits that are borne by the selected PUCCH resource is smaller than the number of the UCI bits, the UE dropping all periodic CSI information, or dropping a part of periodic CSI information until the number of remaining UCI bits is smaller than or equal to the largest number of bits that are borne by the selected PUCCH format, and using the selected PUCCH resource to transmit UCI with all or a part of periodic CSI information being dropped; and/or in response to determining that there is one PUCCH resource for transmission of multiple periodic CSIs configured for the UE, and in response to determining that the largest number of bits that are borne by the one PUCCH resource is smaller than the number of the UCI bits, then the UE dropping all periodic CSI information, or dropping a part of CSI information until the number of remaining UCI bits is smaller than or equal to the largest number of bits that are borne by the one PUCCH format, and using the one PUCCH resource to transmit UCI with the all or part of periodic CSI information being dropped.

The UE has a resource with a PUCCH format 3 or a resource with a PUCCH format X for transmission of HARQ-ACK/SR information indicated by an ARI in the uplink subframe, and in response to determining that the UE is configured with transmission of one periodic CSI in the uplink subframe, determining the PUCCH format and the resource for transmission of PUCCH to transmit the UCI includes: using the resource with the PUCCH format 3 or the resource with the PUCCH format X for transmission of HARQ-ACK/SR information indicated by the ARI to transmit the UCI; or in response to determining that the UE is configured with transmission of multiple periodic CSIs in the uplink subframe, selecting a PUCCH resource from PUCCH resources with candidate PUCCH formats to transmit the UCI; in which the candidate PUCCH formats includes: the PUCCH format 3/PUCCH format X for transmission of HARQ-ACK feedback information configured for the UE and one or more PUCCH resources for transmission of multiple periodic CSIs configured for the UE different from a PUCCH format 2.

The UE has a resource with a PUCCH format 3 or a resource with a PUCCH format X for transmission of HARQ-ACK/SR information indicated by an ARI in the uplink subframe, then in response to determining that the UE is configured with transmission of one or more periodic CSIs in the uplink subframe, determining the PUCCH format and the resource for transmission of PUCCH to transmit the UCI includes: selecting a PUCCH resource from PUCCH resources with candidate PUCCH formats according to the number of the UCI bits to transmit the UCI; in which the candidate PUCCH formats includes: the resource with the PUCCH format 3/the resource with the PUCCH format X for transmission of HARQ-ACK feedback information configured for the UE and one or more PUCCH resources for transmission of multiple periodic CSIs configured for the UE different from a PUCCH format 2.

The method for selecting the PUCCH resource includes:

in response to determining that the number of the UCI bits is smaller than or equal to the largest one of the largest numbers of bits that are borne by the respective candidate PUCCH resources, the UE selecting PUCCH resources with PUCCH formats that are enough to bear the number of the UCI bits from the PUCCH resources with the candidate PUCCH formats, and selecting a PUCCH resource with a PUCCH format by which the largest number of bits that are borne is the smallest from the selected PUCCH resources with the PUCCH formats to transmit the UCI; and in response to determining that there are two PUCCH resources with PUCCH formats selected, in which one is a configured new PUCCH resource for transmission of multiple periodic CSIs, and the other is a PUCCH resource for transmission of HARQ-ACK/SR information indicated by the ARI, then using the PUCCH resource indicated by the ARI or the PUCCH resource for transmission of multiple periodic CSIs; and in response to determining that the number of the UCI bits that need to be transmitted in the uplink subframe is larger than the largest one of the largest numbers of bits that are borne by the candidate PUCCH formats, the UE selecting a PUCCH resource with a PUCCH format by which the largest number of bits that are borne is the largest from the PUCCH resources with the candidate PUCCH formats; and in response to determining that the largest number of bits that are borne by the selected PUCCH resource is smaller than the number of the UCI bits, then the UE dropping all periodic CSI information, or dropping a part of periodic CSI information until the number of remaining UCI bits is smaller than or equal to the largest number of bits that are borne by the selected PUCCH format, and using the selected PUCCH resource to transmit UCI with the all periodic CSI information or part of CSI information being dropped; and in response to determining that there are two PUCCH resources with PUCCH formats selected, in which one is the configured PUCCH resource for transmission of multiple periodic CSIs, and the other is the PUCCH resource for transmission of HARQ-ACK/SR information indicated by the ARI, then the UE using the PUCCH resource indicated by the ARI or the PUCCH resource for transmission of multiple periodic CSIs to transmit the UCI.

The UE has a resource with a PUCCH format 3 or a resource with a PUCCH format X for transmission of HARQ-ACK/SR information indicated by an ARI in the uplink subframe, then in response to determining that the UE is only configured with transmission of one or more periodic CSIs, determining the PUCCH format and the resource for transmission of PUCCH to transmit the UCI comprises: transmitting the UCI using the resource with the PUCCH format 3 or the resource with the PUCCH format X for transmission of HARQ-ACK/SR information indicated by the ARI to transmit the UCI.

Using the resource with the PUCCH format 3 or the resource with the PUCCH format X for transmission of HARQ-ACK/SR information indicated by the ARI to transmit the UCI includes:

in response to determining that the number of UCI bits of all serving cells to be transmitted in the uplink subframe is smaller than or equal to a preset positive integer M, using the PUCCH format 3 to transmit the UCI bits, and the ARI in a (an) (e)PDCCH for PDSCH scheduling indicating a PUCCH resource from a set of PUCCH resources with the PUCCH format 3 configured for the UE by higher layer signaling;

in response to determining that the number of the UCI bits of all the serving cells to be transmitted in the uplink subframe is larger than M, using the PUCCH format X to transmit the UCI bits, and the ARI in the (e)PDCCH for PDSCH scheduling indicating a PUCCH resource from a set of PUCCH resources with the PUCCH format X configured for the UE by higher layer signaling;

in response to determining that the largest number of bits that are transmitted by the PUCCH resource indicated by the ARI is larger than the number of the UCI bits, then using the PUCCH resource indicated by the ARI to transmit the UCI; or otherwise, the UE dropping all periodic CSI information, or dropping a part of periodic CSI information until the number of remaining UCI bits is smaller than or equal to the largest number of bits that are borne by the PUCCH resource indicated by the ARI, using the PUCCH resource indicated by the ARI to transmit UCI with the all or part of periodic CSI information being dropped.

Determining the number of the HARQ-ACK feedback information bits to be transmitted in the uplink subframe includes:

for a serving cell with a downlink reference uplink downlink configuration being frequency division duplex (FDD), in response to determining that a transmission mode configured for the serving cell is single-input multiple-output (SIMO), determining the number of HARQ-ACK bits of the serving cell to be transmitted in the uplink subframe is 1 bit, and in response to determining that the transmission mode configured for the serving cell is multiple-input multiple-output (MIMO), then determining the number of the HARQ-ACK bits of the serving cell to be transmitted in the uplink subframe is 2 bits; for a serving cell with a downlink reference uplink downlink configuration being time division duplex (TDD), in response to determining that a transmission mode of the serving cell is SIMO, determining that the number of HARQ-ACK bits of the serving cell to be transmitted in the uplink subframe is N bits, and in response to determining that the transmission mode configured for the serving cell is MIMO, determine that the number of the HARQ-ACK bits of the serving cell to be transmitted in the uplink subframe is 2N bits;

summing the number of HARQ-ACK feedback information bits of all serving cells of the UE to be transmitted in the uplink subframe to obtain the number of the HARQ-ACK feedback information bits to be sent in the uplink subframe; or calculating the number of the HARQ-ACK feedback information bits to be transmitted in the uplink subframe according to received PDCCHs/EPDCCHs;

in which N is a HARQ-ACK bundling window size.

Determining the number of the UCI bits to be transmitted in the uplink subframe includes:

in response to determining that a spatially bundling operation is not allowed for the HARQ-ACK feedback information to be transmitted, summing the number of HARQ-ACK feedback information bits, the number of CSI bits, and the number of SR bits of all serving cells configured for the UE to obtain a sum, and using the sum as the number of the UCI bits; or in response to determining that the spatially bundling operation is allowed for the HARQ-ACK feedback information to be transmitted, summing the number of the HARQ-ACK feedback information bits, the number of the CSI bits, and the number of the SR bits of all the serving cells configured for the UE to obtain the sum, and in response to determining that the sum is smaller than or equal to a preset positive integer M', then using the sum as the number of the UCI bits; and in response to determining that the sum is larger than the preset positive integer M', then spatially bundling the HARQ-ACK feedback information to be transmitted, and using the number of HARQ-ACK feedback information bits spatially bundled as the number of HARQ-ACK feedback information bits updated, and summing the number of the HARQ-ACK feedback information bits updated, the number of the CSI bits, and the number of the SR bits to obtain a sum, and using the sum as the number of the UCI bits.

An apparatus for transmitting HARQ-ACK feedback information in an enhanced carrier aggregation system, comprising a bit number determination unit, a resource determination unit, and a transmission unit; wherein the bit number determination unit is to determine the number of HARQ-ACK feedback information bits that need to be transmitted by an UE in an uplink subframe; and determine the number of UCI bits to be transmitted in the uplink subframe based on the number of the HARQ-ACK feedback information bits, the number of CSI bits, and the number of SR bits that need to be transmitted in the uplink subframe;

the resource determination unit is to determine a PUCCH format and a resource for transmission of PUCCH according to the number of the UCI bits determined by the bit number determination unit; and the transmission unit is to transmit UCI according to the PUCCH format and the resource for transmission of PUCCH determined by the resource determination unit.

As is seen from the foregoing technical solutions, a UE determines the number of HARQ-ACK feedback information bits that need to be transmitted in an uplink subframe; the UE determines the number of uplink control information (UCI) bits to be transmitted in the uplink subframe based on the number of the HARQ-ACK feedback information bits, the number of channel state information (CSI) bits, and the number of scheduling request (SR) bits that need to be transmitted in the uplink subframe; and determining a physical uplink control channel (PUCCH) format and a resource for transmission of PUCCH to transmit UCI based on the number of the UCI bits to be transmitted in the uplink subframe, and transmitting the UCI according to the PUCCH format and the resource for transmission of PUCCH determined. By using the number of UCI bits to select the PUCCH format and the PUCCH resource, UCI information may be transmitted using different PUCCH formats in different uplink subframes.

Advantageous Effects of Invention

With the present disclosure, UCI information may be transmitted using different formats in different PUCCH formats.

MODE FOR THE INVENTION

For better understanding of the objects, technical solutions, and advantages of the present disclosure, the present disclosure will be described more fully hereinafter with reference to the accompanying drawings.

Figure 1:
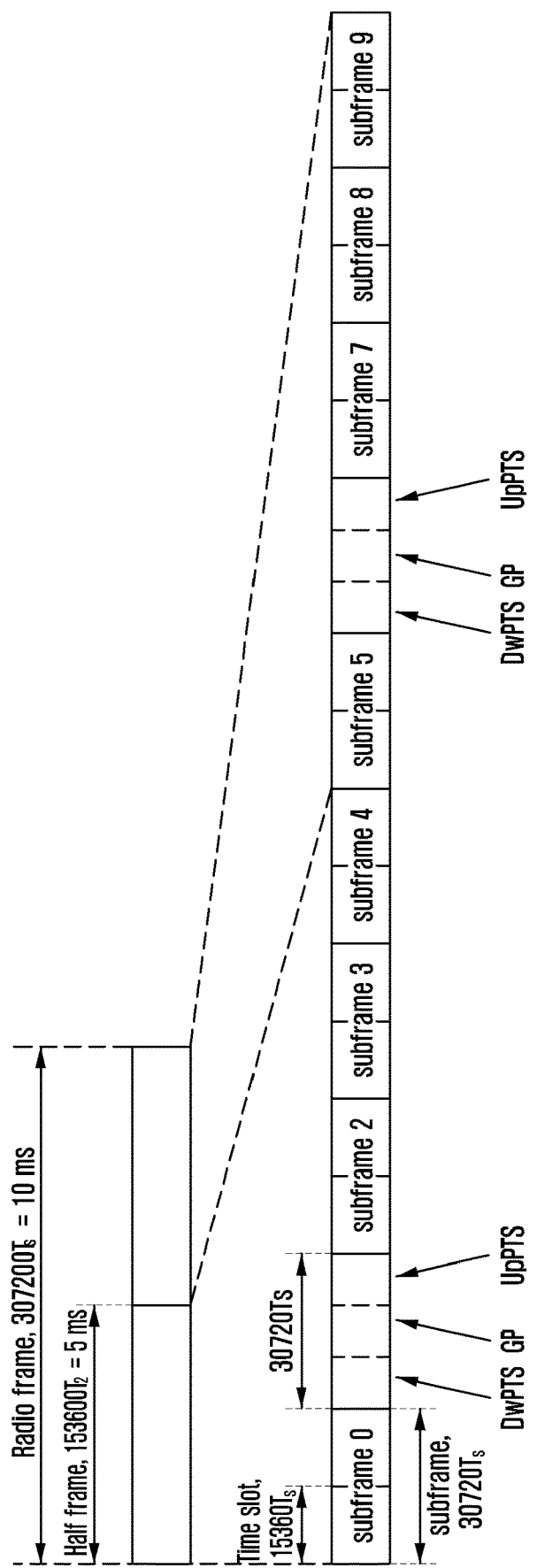
FIG. 1 is a LTE TDD frame structure.
Figure 2:
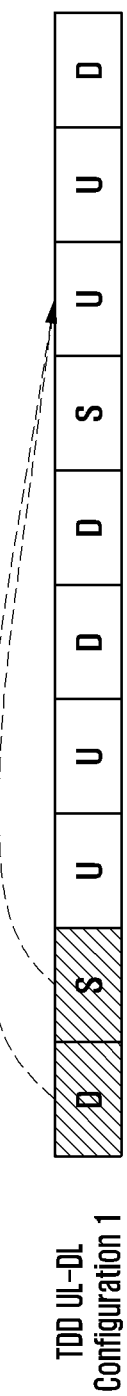
FIG. 2 is a HARQ-ACK timing relation of LTE TDD serving cells.
Figure 3:
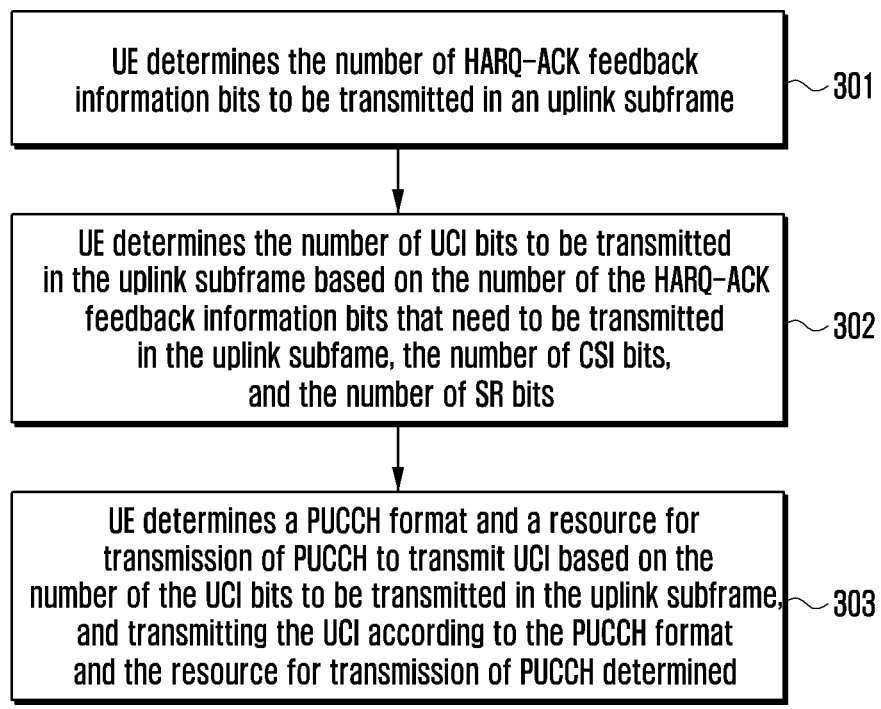
FIG. 3 is a flowchart of a method for transmitting HARQ-ACK feedback information in an enhanced carrier aggregation system provided according to embodiments of the present disclosure.

FIG. 3 is a flowchart of a method for transmitting HARQ-ACK feedback information in an enhanced carrier aggregation system provided according to embodiments of the present disclosure. The method includes the following steps.

Step 301, a UE determines the number of HARQ-ACK feedback information bits that need to be transmitted in an uplink subframe.

Here, the UE may determine the number of the HARQ-ACK feedback information bits that need to be transmitted in the uplink subframe according to the number of serving cells configured for the UE, a transmission mode of each of the serving cells, and a HARQ-ACK bundling window size of each of the serving cells; or the UE may receive base station information signaling, and may obtain the number of the HARQ-ACK feedback information bits that need to be transmitted in the uplink subframe based on received base station information signaling.

Step 302, the UE determines the number of uplink control information (UCI) bits to be transmitted in the uplink subframe according to the number of the HARQ feedback information bits, CSI information bits, and SR bits to be transmitted in the uplink subframe.

In the following, HARQ-ACK feedback information bits, periodic CSI information bits, and SR information bits are called UCI bits. Since CSI is configured periodically, therefore, some uplink subframes may be configured with a periodic CSI transmission, and some may not. Different uplink subframes may transmit different numbers of periodic CSI bits too. The SR is also configured periodically. Some uplink subframes may be configured with a SR transmission, and some may not. When an uplink subframe is configured with a SR transmission, a SR in the uplink subframe is 1 bit.

In addition, since the present disclosure is to solve the problem of HARQ-ACK feedback information transmission, the uplink subframes referred to in this step and in the previous step are uplink subframes that need to transmit HARQ-ACK feedback information. Among these uplink subframes that need to transmit HARQ-ACK feedback information, a part of uplink subframes may not need to transmit CSI information or SR bits. In this case, the number of CSI bits or the number of SR bits in this part of uplink subframes may be considered as 0.

Step 303: the UE determines a PUCCH format and a resource for transmission of PUCCH to transmit uplink control information according to the number of the UCI bits to be transmitted in the uplink subframe.

When the foregoing multiple kinds of UCI information need to be transmitted simultaneously in a same uplink channel, HARQ-ACK feedback information, periodic CSI information, and SR information may be jointly coded; or they may be processed using other methods, which will not be limited herein. In the present disclosure, the PUCCH format to be used, i.e., PUCCH format 3 or newly defined PUCCH format X or PUCCH format Y, is determined according to the total number of UCI bits to be transmitted in a subframe. Accordingly, if the PUCCH format 3 or the newly defined PUCCH format X is used, an ARI in a (an) (E)PDCCH may dynamically indicate one from multiple channels with this kind of PUCCH format semi-statically configured by higher layers, and if the PUCCH format Y is used, then it may be configured semi-statically.

The solution of the present disclosure will be further described with reference to several embodiments.

Embodiment 1

In this embodiment, one of the PUCCH format 3 and the PUCCH format X is selected to transmit UCI based on the total number of UCI bits or the total number of HARQ-ACK/SR bits determined.

To be specific, if the number of UCI bits of all serving cells to be transmitted in an uplink subframe is smaller than or equal to a preset positive integer M (e.g., M is equal to 22) bits, the PUCCH format 3 is used to transmit the UCI bits, and an ARI in a (an) (e)PDCCH for PDSCH scheduling indicates a corresponding PUCCH format 3 resource from a set of PUCCH format 3 resources configured for the UE by higher layer signaling. When the number of the UCI bits of all the serving cells to be transmitted in the uplink subframe is larger than M (e.g., M is equal to 22) bits, the PUCCH format X is used to transmit the UCI bits, and the ARI indicator in the (e)PDCCH for PDSCH scheduling indicates a corresponding PUCCH format X resource from a set of PUCCH format X resources configured for the UE by higher layer signaling, as shown in Table 3.

Table 3

TABLE 3

| PUCCH format X resource indicator | PUCCH format X resource configured by higher layer signaling |
|---|---|
| '00' | First PUCCH format X resource configured by higher layer signaling |
| '01' | Second PUCCH format X resource configured by higher layer signaling |
| '10' | Third PUCCH format X resource configured by higher layer signaling |
| '11' | Fourth PUCCH format X resource configured by higher layer signaling |

PUCCH Format X Resource Indicator

Using the method, the UE may adopt different PUCCH formats in different uplink subframes. In this case, higher layer signaling configures a set of PUCCH format 3 resources and a set of PUCCH format X resources for the UE, used in different subframes.

The foregoing description is related to selection of PUCCH formats and resources.

To determine the number of the UCI bits, assume that in the present embodiment, the UE determines the number of the HARQ-ACK feedback information bits to be transmitted in an uplink subframe according to the number of the serving cells configured for the UE, a transmission mode of each serving cell, and a HARQ-ACK bundling window size of each serving cell. In the following, methods for the UE to calculate the number of the UCI bits to be transmitted in an uplink subframe will be described.

First of all, the UE determines the number of HARQ-ACK bits that need to be transmitted by each serving cell.

Definition of the bundling window size is that: according to a DL reference UL-DL configuration, the number of downlink subframes whose HARQ-ACK feedback information is fed back in a PUCCH is a bundling window size of the serving cell. HARQ-ACK bundling window sizes in different uplink subframes may be different.

For a serving cell, DL reference UL-DL configuration of which is FDD, its bundling window size is 1. Thus, when a transmission mode of the serving cell is configured to be single-input multiple-output (SIMO) where one downlink subframe corresponds to one transmission block, and HARQ-ACK feedback information transmitted is 1 bit, then HARQ-ACK feedback information of the serving cell to be transmitted by the UE is 1 bit; and when the transmission mode of the serving cell is configured to be multiple-input multiple-output (MIMO) where one downlink subframe corresponds to two transmission blocks, and HARQ-ACK feedback information transmitted is 2 bits, then HARQ-ACK feedback information of the serving cell to be transmitted by the UE is 2 bits.

For a serving cell, DL reference UL-DL configuration of which is TDD, assume that its bundling window size is N. Thus, when a transmission mode of the serving cell is configured to be SIMO where one downlink subframe corresponds to one transmission block, and HARQ-ACK feedback information transmitted is 1 bit, then the number of HARQ-ACK bits of the serving cell to be transmitted by the UE is N; and when the transmission mode of the serving cell is configured to be MIMO where one downlink subframe corresponds to two transmission blocks, and HARQ-ACKs transmitted is 2 bits, the number of HARQ-ACK bits of the serving cell to be transmitted by the UE is 2*N.

In the following, the number of UCI bits may be calculated by combining the number of HARQ-ACK feedback information bits, the number of CSI bits, and the number of SR bits of individual serving cells.

Method 1:

Optionally, assume that no bundling operation is performed for HARQ-ACK feedback information to be transmitted in a PUCCH channel. Then, the total number of HARQ-ACK bits to be transmitted by the UE in an uplink subframe is equal to the total number of HARQ-ACK bits of respective cells configured for the UE to be transmitted in the uplink subframe, or is equal to the total number of HARQ-ACK bits to be transmitted in the uplink subframe calculated out by the UE according to received PDCCHs/EPDCCHs. Then the number of UCI bits is equal to a sum of the total number of HARQ-ACK bits to be transmitted in the corresponding uplink subframe, the total number of periodic CSI bits to be transmitted in the corresponding uplink subframe, and the total number of SR bits to be transmitted in the corresponding uplink subframe.

Method 2:

Optionally, to reduce feedback overhead as much as possible, assume that a spatial bundling operation is performed for HARQ-ACK feedback information to be transmitted in a PUCCH channel. Then, the total number of HARQ-ACK bits to be transmitted by the UE in an uplink subframe is equal to the total number of HARQ-ACK bits of respective cells configured for the UE to be transmitted in the uplink subframe, or is equal to the total number of HARQ-ACK bits to be transmitted in the uplink subframe calculated out by the UE according to received PDCCHs/EPDCCHs.

Then a sum of the total number of HARQ-ACK bits to be transmitted in the corresponding uplink subframe, the total number of periodic CSI bits to be transmitted in the corresponding uplink subframe, and the total number of SR bits to be transmitted in the corresponding uplink subframe is calculated. If the sum is smaller than or equal to a preset M' (e.g., M' is equal to 22) bits, then the number of the UCI bits is equal to the sum of the total number of the HARQ-ACK bits to be transmitted in the corresponding uplink subframe, the total number of the periodic CSI bits to be transmitted in the corresponding uplink subframe, and the total number of the SR bits to be transmitted in the corresponding uplink subframe. Or if the sum is larger than the preset M' bits, then HARQ-ACK feedback information should be spatially bundled, so as to re-calculate the number of UCI bits after the spatially bundling operation is performed. That is, the number of the HARQ-ACK bits to be transmitted by the UE in an uplink subframe is equal to the number of spatially bundled HARQ-ACK bits of the respective cells configured for the UE to be transmitted in the uplink subframe. Then the number of UCI bits is equal to a sum of the total number of the spatially bundled HARQ-ACK bits to be transmitted in the corresponding uplink subframe, the total number of the periodic CSI bits to be transmitted in the corresponding uplink subframe, and the total number of the SR bits to be transmitted in the corresponding uplink subframe.

Embodiment 2

To transmit HARQ-ACK feedback information, higher layer signaling allocates a set of PUCCH format 3 resources and a set of PUCCH format X resources for a UE, and meanwhile, the UE is configured with periodic CSI feedback in some subframes to feedback CSI using PUCCH format 2/2A/2B or PUCCH format Y. The number of bits that can be borne by the PUCCH format Y is L. Higher layer signaling semi-statically configures a PUCCH format Y resource for the UE.

A PUCCH format and a PUCCH transmission resource may be determined differently depending on whether a periodic CSI transmission and a SR transmission are configured in subframe n or not, which will be described hereinafter.

1. When the UE has not been configured with the periodic CSI transmission in the subframe n, then the PUCCH format to transmit HARQ-ACK feedback information in the subframe n is determined according to the number UCI bits consisting of the number of HARQ-ACK bits and/or the number of SR bits, a detailed description of which is as follows.

1) In the subframe n, when the UE does not have a PUCCH format 3 resource or PUCCH format X resource indicated by an ARI, the UE uses a PUCCH format 1A/1B to transmit UCI on a PUCCH format 1A/1B resource.

2) In the subframe n, when the UE has a PUCCH format 3 resource or PUCCH format X resource indicated by an ARI, if the number of the UCI bits is smaller than or equal to m (e.g., m=22) bits, then the UE uses the PUCCH format 3 to transmit UCI on the PUCCH format 3 resource.

3) In the subframe n, when the UE has a PUCCH format 3 resource or PUCCH format X resource indicated by an ARI, if the number of the UCI bits is larger than m bits, then the UE uses a new PUCCH format X to transmit UCI. Here the new PUCCH format X refers to a PUCCH format distinct from the PUCCH format 3.

2. When the UE is configured with the periodic CSI transmission but is not configured with the SR transmission in the subframe n, then the PUCCH format to transmit UCI in the subframe n is determined according to the number of UCI bits consisting of the number of HARQ-ACK bits and/or periodic CSI bits to be transmitted. Here, in the subframe n, when the UE does not has a PUCCH format 3 resource or PUCCH format X resource indicated by an ARI, there may be two situations to determine the PUCCH format and the corresponding PUCCH transmission resource to transmit UCI.

1) In the subframe n, in a situation where the number of UCI bits (i.e., a sum of the total number of CSI bits and/or the total number of HARQ-ACK bits) is smaller than or equal to m (e.g., m=22) bits, either of the following two methods may be used to determine the PUCCH format and its corresponding transmission resource.

a, In the subframe n, when the number of periodic CSI bits is smaller than or equal to n' (e.g., n'=11) bits, the UE may adopt the PUCCH format 2/2A/2B to transmit UCI on a PUCCH format 2/2A/2B resource; and when the number of periodic CSI bits is larger than n', the UE may adopt the PUCCH format 3 to transmit UCI on a PUCCH format 3 resource.

b, In the subframe n, when a periodic CSI transmission of only one serving cell or a periodic CSI transmission with one CSI process of only one serving cell is configured, the UE adopts the PUCCH format 2/2A/2B to transmit UCI on the PUCCH format 2/2A/2B resource; and when a periodic CSI transmission of more than one serving cell, or a periodic CSI transmission with one CSI process of more than one serving cell is configured, then the UE adopts the PUCCH format 3 to transmit UCI on the PUCCH format 3 resource.

2) In the subframe n, in a situation where the number of UCI bits (i.e., a sum of the total number of periodic CSI bits and/or the total number of HARQ-ACK bits) is larger than m (e.g., m=22) bits, then a new PUCCH format Y may be used to transmit UCI. Here, the new PUCCH format Y refers to a PUCCH format distinct from the PUCCH format 3 and the PUCCH format 2/2A/2B, and the new PUCCH format Y, the PUCCH format 3, and the PUCCH format 2/2A/2B may be configured by high layer signaling.

3. When the UE is configured with the periodic CSI transmission and the SR transmission in the subframe n, then the PUCCH format to transmit UCI in the subframe n is determined according to the number of UCI bits consisting of the number of HARQ-ACK bits and/or the number of periodic CSI bits and/or the number of SR bits to be transmitted. In the subframe n, when the UE does not have a PUCCH format 3 resource or PUCCH format X resource indicated by an ARI, there may be two situations to determine the PUCCH format and the corresponding PUCCH transmission resource to transmit UCI.

1) In the subframe n, in a situation where the number of UCI bits (i.e., a sum of the number of HARQ-ACK bits and/or the number of periodic CSI bits and/or the number of SR bits) is smaller than or equal to m (e.g., m=22) bits, either of the following two methods may be used to determine the PUCCH format and the corresponding PUCCH transmission resource.

a, In the subframe n, when the number of CSI bits is smaller than or equal to n' (e.g., n'=11) bits, periodic CSI will not be transmitted, and the PUCCH format 1A/1B may be used to transmit HARQ-ACK and SR information on a PUCCH format 1A/1B resource; and when the number of the CSI bits is larger than n', the PUCCH format 3 is used to transmit UCI on a PUCCH format 3 resource.

b, In the subframe n, when a sum of the number of periodic CSI bits and the number of SR bits is smaller than or equal to n' bits, the PUCCH format 2/2A/2B may be used to transmit UCI on a PUCCH format 2/2A/2B resource; and when the sum of the number of periodic CSI bits and the number of SR bits is larger than n' bits, the PUCCH format 3 is used to transmit UCI on a PUCCH format 3 resource.

2) In the subframe n, in a situation where the number of UCI bits (i.e., a sum of the number of periodic CSI bits and/or the number of SR bits and/or the number of HARQ-ACK bits) is larger than m (e.g., m=22) bits, then a new PUCCH format Y may be used to transmit UCI. Here, the new PUCCH format Y refers to a PUCCH format distinct from the PUCCH format 3 and the PUCCH format 2/2A/2B, and the new PUCCH format Y, the PUCCH format 3, and the PUCCH format 2/2A/2B are configured by higher layer signaling.

4. When the UE is configured with the periodic CSI transmission and/or the SR transmission in the subframe n, the PUCCH format to transmit UCI in the subframe n is determined according to the number of UCI bits consisting of the number of HARQ-ACK bits and/or the number of periodic CSI bits and/or the number of SR bits to be transmitted. The PUCCH format and the PUCCH transmission resource used to transmit UCI may be determined according to either of the following two methods.

1) In the subframe n, when the UE has a PUCCH format 3 resource or PUCCH format X resource indicated by an ARI, if the number of the UCI bits is smaller than or equal to m (e.g., m=22) bits, the UE uses the PUCCH format 3 to transmit UCI on the PUCCH format 3 resource; and if the number of the UCI bits is larger than m bits, the UE uses a new PUCCH format X to transmit UCI. Here, the new PUCCH format X refers to a PUCCH format different from the PUCCH format 3.

2) In the subframe n, when the UE has the PUCCH format 3 resource or PUCCH format X resource indicated by the ARI, if the number of the UCI bits is smaller than or equal to n' (e.g., n'=11) bits, the UE uses the PUCCH format 2/2A/2B to transmit UCI on a PUCCH format 2/2A/2B resource; and if the number of the UCI bits is larger than n' and is smaller than or equal to m, then the UE uses the PUCCH format 3 to transmit UCI on the PUCCH format 3 resource; and if the number of the UCI bits is larger than m, a new PUCCH format X is used to transmit UCI. Here, the new PUCCH format X refers to a PUCCH format different from the PUCCH format 3.

If in the uplink subframe that needs to transmit HARQ-ACK feedback information, there are not only a PUCCH format 1A/1B or PUCCH format 3 or PUCCH format X resource to transmit HARQ-ACK feedback information, but also a PUCCH format Y resource to transmit periodic CSI, then the UE may select a PUCCH format from the PUCCH format 3/PUCCH format X and the PUCCH format Y to transmit UCI according to the methods in the present embodiment. Further, to improve resource utilization, the UE may select the PUCCH format Y and a corresponding resource to transmit UCI preferably. Herein, "/" represents "or".

To be specific, in the uplink subframe configured with a PUCCH format Y resource to transmit periodic CSI, if the number of the UCI bits that need to be transmitted in the uplink subframe is smaller than or equal to L, then the UE uses the PUCCH format Y to transmit UCI on a configured corresponding PUCCH resource.

If the number of the UCI bits that need to be transmitted in the uplink subframe is larger than L, then the UE may select a PUCCH format that can bear more bits from the PUCCH format 3/PUCCH format X for transmission of HARQ-ACK feedback information and the PUCCH format Y for transmission of periodic CSI information. When the number of the UCI bits that need to be transmitted in the uplink subframe is smaller than or equal to the largest number of bits that can be borne by the selected PUCCH format, then the UE uses the selected PUCCH format and a configured resource with the PUCCH format to transmit UCI. When the number of the UCI bits that need to be transmitted in the uplink subframe is larger than the largest number of bits that can be borne by the selected PUCCH format, then the UE may drop all periodic CSI information, or the UE may drop a part of periodic CSI information until the number of remaining UCI bits is smaller than the largest number of bits that can be borne by the selected PUCCH format.

If the numbers of bits that can be borne by the PUCCH format 3/PUCCH format X and the PUCCH format Y are same, then the UE may select the PUCCH format Y for transmission of periodic CSI and a PUCCH format Y resource configured for the UE to transmit UCI.

In the foregoing situation where the number of the UCI bits is larger than L, when the number of UCI bits that need to be transmitted in the uplink subframe is larger than the largest number of bits that can be borne by the PUCCH format 3/PUCCH format X, the UE may drop all periodic CSI information, or may drop a part of periodic CSI information, to obtain updated UCI, and the UE uses the selected PUCCH format and a transmission resource to transmit updated UCI.

Through the foregoing methods, the UE is able to use a PUCCH format Y resource configured by higher layer signaling to transmit UCI in priority, so as to use the PUCCH format Y resource as much as possible. Since this PUCCH format Y resource is allocated semi-statically by higher layer signaling, while a PUCCH format X or PUCCH format 3 resource for transmission of HARQ-ACK feedback information may be dynamically indicated using an ARI, the PUCCH format X or PUCCH format 3 resource may be indicated dynamically to other UEs to use, which improves resource utilization.

The number of UCI bits may be calculated according to the calculation methods in Embodiment 1.

Embodiment 3

In the following, several methods for transmitting UCI will be described. For each PUCCH format, the number of bits that it can bear is limited, and to be specific, limited by the largest number of bits that each PUCCH format can bear. In the present embodiment, the number of UCI bits is compared with the largest numbers of bits that can be borne various PUCCH formats, and a PUCCH format is selected to transmit UCI according to a comparison result, or according to the number of PUCCHs supported by the UE, Method 1:

When the number of the UCI bits that need to be transmitted in the uplink subframe is smaller than or equal to the largest one among the largest numbers of bits that can be borne by the PUCCH format 3/PUCCH format X for transmission of HARQ-ACK feedback information and the PUCCH format 3/PUCCH format Y for transmission of CSI, the UE may select PUCCH formats that are enough to bear the UCI bits from the PUCCH formats for transmission of HARQ-ACK feedback information and the PUCCH formats for transmission of CSI, and may select a PUCCH format by which the largest number of UCI bits that can be borne is the smallest among the selected PUCCH formats to transmit UCI. Being enough to bear the UCI bits means the largest number of bits that can be borne by a PUCCH format is larger than or equal to the number of the UCI bits.

When the number of the UCI bits that need to be transmitted in the uplink subframe is larger than the largest one of the largest numbers of bits that can be borne by the PUCCH format 3/PUCCH format X for transmission of HARQ-ACK feedback information and the PUCCH format 3/PUCCH format Y for transmission of CSI, the UE may select a PUCCH format by which the largest number of bits that can be borne is the largest from the PUCCH formats for HARQ-ACK transmission and the PUCCH formats for transmission of CSI, drop all periodic CSI information, or drop a part of periodic CSI information until the number of remaining UCI bits is smaller than the largest number of bits that can be borne by the selected PUCCH format. Then the UE selects PUCCH formats that are enough to bear remaining UCI from the PUCCH formats for transmission of HARQ-ACK and the PUCCH formats for transmission of CSI, and selects a PUCCH format by which the largest number of bits that can be borne is the smallest to transmit remaining UCI. Remaining UCI is UCI with all CSI information or the part of CSI information being dropped, and being enough to bear remaining UCI means that the largest number of bits that can be borne by a PUCCH format is larger than or equal to the number of the remaining UCI bits.

Method 2:

When the number of the UCI bits that need to be transmitted in the uplink subframe is smaller than or equal to the largest one of the largest numbers of bits that can be borne by the PUCCH format 3/PUCCH format X for transmission of HARQ-ACK feedback information and the PUCCH format 3/PUCCH format Y for transmission of CSI, the UE may select PUCCH formats that are enough to bear the UCI bits from the PUCCH formats for transmission of HARQ-ACK feedback information and the PUCCH formats for transmission of CSI, and select a PUCCH format by which the largest number of bits that can be borne is the smallest from the selected PUCCH formats to transmit UCI. Being enough to bear the UCI bits means the largest number of bits that can be borne by a PUCCH format is larger than or equal to the number of the UCI bits.

When the number of the UCI bits that need to be transmitted in the uplink subframe is larger than the largest one of the largest numbers of bits that can be borne by the PUCCH format 3/PUCCH format X for transmission of HARQ-ACK feedback information and the PUCCH format 3/PUCCH format Y for transmission of CSI, the following methods may be used.

1) If the UE supports a simultaneous transmission of two PUCCHs, and a system configures (e.g., higher layer signaling configures) the UE to transmit two PUCCHs simultaneously, then the UE may transmit HARQ-ACK and SR information on one of the PUCCH resources, and transmit CSI on the other PUCCH resource. When the UE transmits HARQ-ACK and SR information or CSI on the PUCCH resources, the UE may select formats of the PUCCH resources using a method same as traditional methods.

2) If the UE supports a transmission of one PUCCH and this PUCCH uses the PUCCH resources for transmission of HARQ-ACK feedback information and the PUCCH resources for transmission of periodic CSI at the same time, and meanwhile, the system configures (e.g., higher layer singling configures) the UE to support a transmission of one PUCCH, and this PUCCH uses the PUCCH resources for transmission of HARQ-ACK feedback information and the PUCCH resources for transmission of periodic CSI at the same time, then, the UE transmits HARQ-ACK feedback information and periodic CSI on this PUCCH that it supports. When the UE transmits HARQ-ACK and CSI information on the PUCCH, it may select the format of a PUCCH resource using a method same as traditional ones.

3) If the UE does not support the simultaneous transmission of two PUCCHs, or if the UE supports the simultaneous transmission of two PUCCHs, but the system has not configured (e.g., higher layer signaling has not configured) the UE to simultaneously transmit two PUCCHs, or if the UE does not support the transmission of one PUCCH, and the PUCCH uses the PUCCH resources for transmission of HARQ-ACK feedback information and PUCCH resources for transmission of periodic CSI at the same time, or if the UE supports the transmission of one PUCCH, and this PUCCH uses the PUCCH resources for transmission of HARQ-ACK feedback information and the PUCCH resources for transmission of periodic CSI at the same time, but the system has not configured (e.g., higher layer signaling has not configured) the UE to support the transmission of one PUCCH, and the PUCCH uses the PUCCH resources for transmission of HARQ-ACK feedback information and PUCCH resources for transmission of periodic CSI at the same time, then in the foregoing four situations, the UE may select a PUCCH format by which the largest number of bits that can be borne is the largest from the PUCCH formats for transmission of HARQ-ACK feedback information and the PUCCH formats for transmission of CSI, drop all periodic CSI information, or drop a part of periodic CSI information until the number of remaining UCI bits is smaller than the largest number of bits that can be borne by the selected PUCCH format. Then the UE may select PUCCH formats that are enough to bear remaining UCI from the PUCCH formats for transmission of HARQ-ACK feedback information and the PUCCH formats for transmission of CSI, and select a PUCCH format by which the largest number of bits that can be borne is the smallest from the selected PUCCH formats to transmit remaining UCI.

Figure 4:
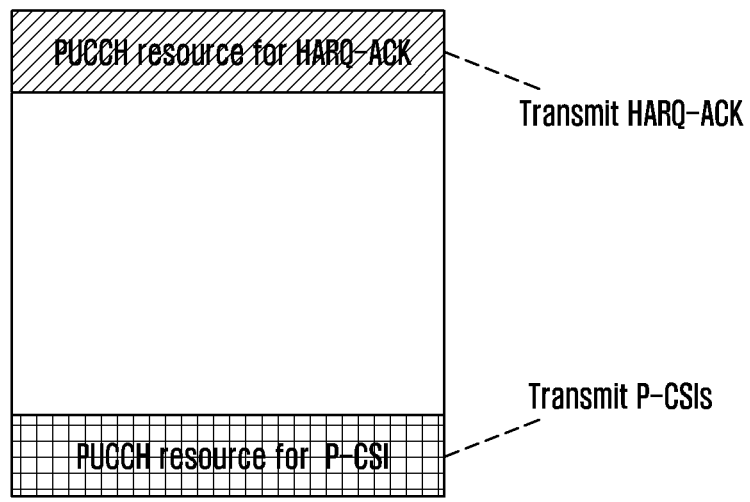
FIG. 4 is a first schematic diagram of transmitting UCI using a PUCCH in Method 3 of Embodiment 3.

Method 3:

If the UE supports the simultaneous transmission of two PUCCHs, and the system configures (e.g., higher layer signaling configures) the UE to simultaneously transmit two PUCCHs, then the UE may transmit HARQ-ACK and SR information on one of the PUCCH resources, and transmit CSI on the other PUCCH resource, as shown in FIG. 4. In FIG. 4, when HARQ-ACK and SR information or CSI is transmitted on the PUCCH resources, formats of the PUCCH resources may be selected using a method same as traditional ones.

Figure 5:
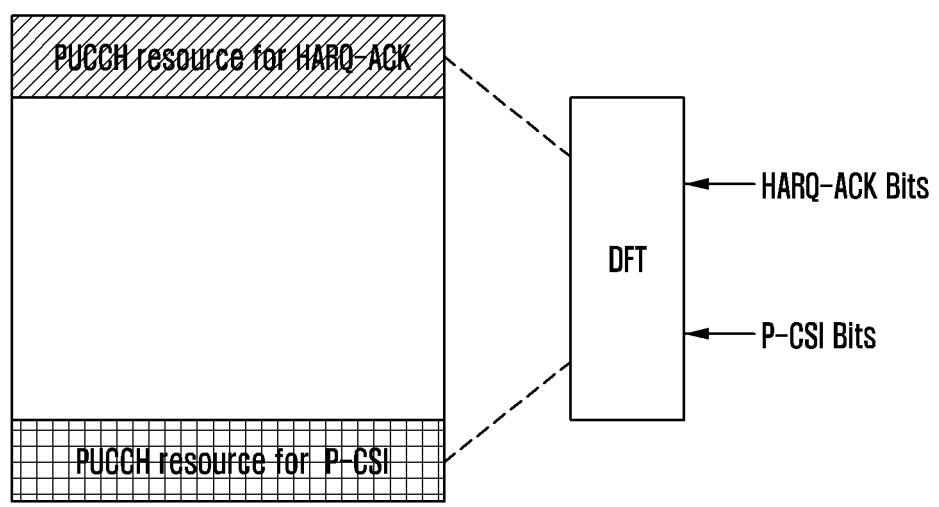
FIG. 5 is a second schematic diagram of transmitting UCI using a PUCCH in Method 3 of Embodiment 3.

If the UE supports the transmission of one PUCCH (this PUCCH uses the PUCCH resources for transmission of HARQ-ACK feedback information and the PUCCH resources for transmission of periodic CSI at the same time), and the system configures (e.g., higher layer signaling configures) the UE to support a transmission of one PUCCH (this PUCCH uses the PUCCH resources for transmission of HARQ-ACK and the PUCCH resources for transmission of periodic CSI at the same time), then the UE may transmit HARQ-ACK and periodic CSI information on this PUCCH, as shown in FIG. 5. When the UE transmits HARQ-ACK and CSI information on the PUCCH, the UE may select formats of the PUCCH resources using a method same as traditional ones.

If the UE does not support the simultaneous transmission of two PUCCHs, or the UE supports the simultaneous transmission of two PUCCHs, but the system has not configured the UE to simultaneously transmit two PUCCHs, or if the UE does not support the transmission of one PUCCH (this PUCCH uses the PUCCH resources for transmission of HARQ-ACK feedback information and the PUCCH resources for transmission of periodic CSI at the same time), or if the UE supports the transmission of one PUCCH (this PUCCH uses the PUCCH resources for transmission of HARQ-ACK feedback information and the PUCCH resources for transmission of periodic CSI at the same time), but the system has not configured the UE to support the transmission of one PUCCH (this PUCCH uses the PUCCH resources for transmission of HARQ-ACK feedback information and the PUCCH resources for transmission of periodic CSI at the same time), then in the foregoing four situations, the UE may select a PUCCH format by which the largest number of bits that can be borne is the largest from the PUCCH formats for transmission of HARQ-ACK feedback information and the PUCCH formats for transmission of CSI, drop all periodic CSI, or drop a part of periodic CSI until the number of remaining UCI bits is smaller than the largest number of bits that can be borne by the selected PUCCH format. Then the UE may select PUCCH formats that are enough to bear remaining UCI from the PUCCH formats for transmission of HARQ-ACK feedback information and the PUCCH formats for transmission of CSI, and select a PUCCH format by which the largest number of bits that can be borne is the smallest from the selected PUCCH formats to transmit remaining UCI.

Method 4:

In the present method, when a method to transmit UCI is determined, it may be determined according to power restrictions of the UE and PUCCHs supported by the UE.

1) If the power of the UE is not restricted, the UE supports the simultaneous transmission of two PUCCHs, and higher layer signaling configures the UE to transmit two PUCCHs at the same time, then the UE may transmit HARQ-ACK and SR information on one of the PUCCH resources and transmit CSI information on the other PUCCH source; in which when the UE transmits HARQ-ACK and SR information or CSI information on the PUCCH resources, the UE may select formats of the PUCCH resources using a method same as traditional ones.

2) If the power of the UE is not restricted, the UE supports the transmission of one PUCCH (this PUCCH uses the PUCCH resources for transmission of HARQ-ACK feedback information and the PUCCH resources for transmission of periodic CSI at the same time), and higher layer signaling configures the UE to support the transmission of one PUCCH (this PUCCH uses the PUCCH resources for transmission of HARQ-ACK feedback information and the PUCCH resources for transmission of periodic CSI at the same time), then the UE transmits HARQ-ACK and periodic CSI information on this supported PUCCH; in which when the UE transmits HARQ-ACK and CSI information on the PUCCH, the UE may select formats of the PUCCH resources using a method same as traditional ones.

3) If the power of the UE is not restricted and the UE does not support the simultaneous transmission of two PUCCHs, or if the power of the UE is not restricted, the UE supports the simultaneous transmission of two PUCCHs, but higher layer signaling has not configured the UE to transmit two PUCCHs at the same time, or if the power of the UE is not restricted, and the UE does not support the transmission of one PUCCH (this PUCCH uses the PUCCH resources for transmission of HARQ-ACK feedback information and the PUCCH resources for transmission of periodic CSI at the same time), or if the power of the UE is not restricted, the UE supports the transmission of one PUCCH (this PUCCH uses the PUCCH resources for transmission of HARQ-ACK feedback information and the PUCCH resources for transmission of periodic CSI at the same time), but higher layer signaling has not configured the UE to support the transmission of one PUCCH (this PUCCH uses the PUCCH resources for transmission of HARQ-ACK feedback information and the PUCCH resources for transmission of periodic CSI at the same time), or if the power of the UE is restricted, then in the foregoing five situations, the UE may select a PUCCH format by which the largest number of bits that can be borne is the largest from the PUCCH formats for transmission of HARQ-ACK feedback information and the PUCCH formats for transmission of periodic CSI, drop all periodic CSI information or a part of periodic CSI information until the number of remaining UCI bits is smaller than the largest number of bits that can be borne by the selected PUCCH format. Then the UE selects PUCCH formats that are enough to bear remaining UCI from the PUCCH formats for transmission of HARQ-ACK feedback information and the PUCCH formats for transmission of CSI, and selects a PUCCH format by which the largest number of bits that can be borne is the smallest from the selected PUCCH formats to transmit remaining UCI.

Embodiment 4

The method in this embodiment is applicable for an enhanced carrier aggregation system, i.e., a system where the number of downlink carriers configured for a UE is larger than 5 but less than 32, or a system with more than 2 TDD UL-DL configurations 5, or is applicable for other downlink carrier combinations defined by an enhanced carrier aggregation system.

A PUCCH resource used by the UE to transmit a periodic CSI is a PUCCH resource with the PUCCH format 2/2a/2b. The number of PUCCH resources to transmit multiple periodic CSIs may at most be two, or one. If there are two PUCCH resources to transmit multiple periodic CSIs, then formats of the two PUCCH resources may both be a new PUCCH format (here, the new PUCCH format includes two kinds of formats in which one is a new PUCCH format based on a PUSCH structure, and the other is a new PUCCH format based on the PUSCH structure and code division multiplexing. In the following, the new structure refers to either of these two kinds of PUCCH formats, and will not be specifically pointed out), and the number of physical resource blocks (PRBs) occupied by them may be different; or one is a PUCCH resource with the new PUCCH format, and the other is a PUCCH resource with the PUCCH format 3. If there is one PUCCH resource used to transmit the multiple periodic CSIs, the PUCCH resource may be a PUCCH resource with the new PUCCH format, or may be a PUCCH resource with the PUCCH format 3.

When the UE is configured with the periodic CSI transmission in the subframe n, and transmits HARQ-ACK bits and/or SR bits in the subframe n at the same time, i.e., the UE transmitting periodic CSI in the subframe n and at the same time transmitting the HARQ-ACK bits and/or the SR bits, then the UE may select a PUCCH format and a PUCCH resource according to the following methods.

Situation 1:

The UE has only a PUCCH format 1/1a/1b resource to transmit HARQ-ACK/SR information in the subframe n, and does not have a PUCCH format 3 resource or new PUCCH format X resource indicated by an ARI.

Method 1:

When the UE configures one or more periodic CSIs in the subframe n, the UE may use a PUCCH resource for transmission of multiple periodic CSIs to transmit periodic CSI and HARQ-ACK/SR information, in which "/" represents "and/or". If two PUCCH resources for transmission of multiple periodic CSIs are configured for the UE, then the UE may select one of the two PUCCH resources based on the total number of UCI bits consisting of the periodic CSI and HARQ-ACK/SR information. A principle to select the PUCCH resource is that when the largest numbers of bits that can be transmitted by the two PUCCH resources are both larger than the total number of the UCI bits, the UE selects a resource by which the largest number of bits that can be transmitted is smaller from the two PUCCH resources to transmit UCI, or otherwise, the UE selects a PUCCH resource by which the largest number of bits that can be transmitted is larger from the two PUCCH resources to transmit UCI. If the largest number of bits that can be borne by the selected PUCCH resource is smaller than the number of UCI bits to be transmitted, the UE may drop all periodic CSI information, or drop a part of periodic CSI information until the number of remaining UCI bits is smaller than or equal to the largest number of bits that can be borne by the selected PUCCH format, and the UE uses this PUCCH resource to transmit UCI with all or a part of CSI being dropped. If only one PUCCH resource for transmission of multiple CSIs is configured for the UE, and if the largest number of bits that can be borne by this PUCCH resource is smaller than the number of UCI bits to be transmitted, the UE may drop all periodic CSI information, or drop a part of periodic CSI information until the number of remaining UCI bits is smaller than or equal to the largest number of bits that can be borne by the PUCCH format, and the UE uses this PUCCH resource to transmit UCI with all or the part of periodic CSI being dropped. If only one PUCCH resource for transmission of multiple CSIs is configured for the UE, and if the largest number of bits that can be borne by the PUCCH resource is larger than or equal to the number of the UCI bits to be transmitted, then the UE uses the PUCCH resource to transmit UCI.

Method 2:

When the UE is configured with one periodic CSI in the subframe n, and only needs to transmit HARQ-ACK feedback information of a scheduled PDSCH where a DAI is equal to 1 and/or SPS downlink transmission of a Pcell, and if the subframe n has not been configured with the SR transmission, the UE uses a PUCCH format 2a/2b resource for transmission of periodic CSI configured for the UE to transmit periodic CSI and HARQ-ACK feedback information. When the UE is configured with one periodic CSI in the subframe n, and there is no PUCCH format 3 resource or PUCCH format X resource indicated by an ARI, if the subframe n has been configured with the SR transmission, the UE uses a PUCCH format 1/1a/1b resource to transmit HARQ-ACK/SR information, and does not transmit periodic CSI.

When the UE is configured with transmission of multiple periodic CSIs in the subframe n, the UE uses a PUCCH resource for transmission of multiple periodic CSIs configured for the UE to transmit periodic CSI and HARQ-ACK/SR information. If PUCCH resources for transmission of multiple periodic CSIs configured for the UE are two, the UE may select one PUCCH resource based on the total number of UCI bits consisting of periodic CSI and HARQ-ACK/SR information. A principle of selection is that when the largest numbers of bits that can be transmitted by the two PUCCH resources are both larger than the total number of UCI bits, the UE selects a PUCCH resource by which the largest number of bits that can be borne is smaller to transmit UCI, or otherwise, the UE selects a PUCCH resource by which the largest number of bits that can be borne is larger to transmit UCI; or if the largest number of bits that can be borne by the selected PUCCH resource is smaller than the number of the UCI bits to be transmitted, the UE drops all periodic CSI information, or drops a part of periodic CSI information until the number of remaining UCI bits is equal to the largest number of bits that can be borne by the selected PUCCH resource, and then the UE uses the selected PUCCH resource to transmit UCI with all or a part of periodic CSI information being dropped. If there is only one PUCCH resource for transmission of multiple periodic CSIs configured for the UE, and if the largest number of bits that can be borne by the PUCCH resource is smaller than the UCI bits to be transmitted, then the UE drops all periodic CSI information, or drops a part of periodic CSI information until the number of remaining UCI bits is smaller than or equal to the largest number of bits that can be borne by the PUCCH format, and use the resource to transmit UCI with all or the part of periodic CSI information being dropped. If there is only one PUCCH resource for transmission of multiple periodic CSIs configured for the UE, and if the largest number of bits that can be borne by the PUCCH resource is larger than or equal to the number of the UCI bits to be transmitted, then the PUCCH resource is used to transmit UCI.

Situation 2:

The UE has a PUCCH format 3 resource or new PUCCH format X resource for transmission of HARQ-ACK/SR information indicated by an ARI in the subframe n.

Method 1:

If the UE is only configured with transmission of one periodic CSI in the subframe n, the UE uses a PUCCH format 3 resource or new PUCCH format X resource for transmission of HARQ-ACK/SR information to transmit HARQ-ACK/SR and periodic CSI information. When the number of UCI bits of all serving cells to be transmitted in the subframe n is smaller than or equal to a positive integer M (M is configured by higher layer signaling, or is preset by a protocol, e.g., M=22) bits, the UE uses the PUCCH format 3 to transmit the UCI bits, and an ARI in a (an) (e)PDCCH for PDSCH scheduling indicates a corresponding resource from a set of PUCCH format 3 resources configured for the UE by higher layer signaling. When the number of the UCI bits of all the serving cells to be transmitted in an uplink subframe is larger than M (M is configured by higher layer signaling, or is preset by a protocol, e.g., M is equal to 22) bits, then the UE uses the PUCCH format X to transmit the UCI bits, and an ARI in a(an) (e)PDCCH for PDSCH scheduling indicates a corresponding resource of a set of PUCCH format X resources configured for the UE by higher layer signaling. When the largest number of bits that can be transmitted by the PUCCH resource indicated by the ARI is larger than the total number of the UCI bits, the UE uses the PUCCH resource to transmit UCI; or otherwise, the UE drops all periodic CSI information or a part of periodic CSI information until the number of remaining UCI bits is smaller than or equal to the largest number of bits that can be borne by PUCCH resource indicated by the ARI, and the UE uses this PUCCH resource to transmit UCI with all or the part of periodic CSI information being dropped.

If the UE is configured with transmission of multiple periodic CSIs in the subframe n, then the UE may select a PUCCH resource from the PUCCH format 3/PUCCH format X resource for transmission of HARQ-ACK feedback information and one or two PUCCH resources different from the PUCCH format 2 for transmission of multiple periodic CSIs configured for the UE to transmit UCI. A detailed method of selection is that when the number of the UCI bits that need to be transmitted in the subframe n is smaller than or equal to the largest one of the largest numbers of bits that can be borne by the PUCCH format 3/PUCCH format X resource configured for transmission of HARQ-ACK feedback information and the one or two PUCCH resources different from the PUCCH format 2 for transmission of multiple periodic CSIs configured for the UE, the UE selects PUCCH resources with PUCCH formats which are enough to bear the UCI bits from the PUCCH format 3/PUCCH format X resource configured for transmission of HARQ-ACK feedback information and the one or two PUCCH resources different from the PUCCH format 2 for transmission of multiple periodic CSIs configured for the UE, and selects a PUCCH resource with a PUCCH format by which the largest number of bits that can be borne is the smallest from the selected PUCCH resources with the PUCCH formats to transmit UCI. If there are two PUCCH resources with the PUCCH formats selected, in which one is a new PUCCH resource configured for transmission of multiple periodic CSIs, and the other is a PUCCH resource for transmission of HARQ-ACK/SR information indicated by an ARI, then one method is using the PUCCH resource indicated by the ARI, and the other method is using the PUCCH resource for transmission of multiple periodic CSIs. When the number of the UCI bits that need to be transmitted in the subframe n is larger than the largest one of the largest numbers of bits that can be borne by the PUCCH format 3/PUCCH format X for transmission of HARQ-ACK feedback information and one or more PUCCH resources different from the PUCCH format 2 configured for the UE for transmission of multiple periodic CSIs, the UE selects a PUCCH resource with a PUCCH format by which the largest number of UCI bits that can be borne is the largest from the PUCCH format 3/PUCCH format X for transmission of HARQ-ACK feedback information and one or more PUCCH resources different from the PUCCH format 2 configured for the UE for transmission of multiple periodic CSIs. If the largest number of bits that can be borne by the selected PUCCH resource is smaller than the number of the UCI bits to be transmitted, the UE drops all periodic CSI information, or drops a part of periodic CSI information until the number of remaining UCI bits is smaller than or equal to the largest number of bits that can be borne by the selected PUCCH format, and uses the selected PUCCH resource to transmit UCI with all periodic CSI information or the part of periodic CSI information being dropped. If there are two PUCCH resources with the PUCCH formats selected, in which one is a PUCCH resource configured for transmission of multiple periodic CSIs, and the other is a PUCCH resource for transmission of HARQ-ACK/SR information indicated by an ARI, then one method is to use the PUCCH resource indicated by the ARI, and another method is to use the PUCCH resource for transmission of multiple periodic CSIs.

Method 2:

If the UE is configured with transmission of one or more periodic CSIs in the subframe n, the UE may select a PUCCH resource from the PUCCH format 3/PUCCH format X for transmission of HARQ-ACK feedback information and one or two PUCCH resources with a format different from the PUCCH format 2 for transmission of multiple periodic CSIs configured for the UE to transmit UCI according to the total number of the UCI bits. A specific method of selection is that when the number of the UCI bits that need to be transmitted in the subframe n is smaller than or equal to the largest one of the largest numbers of bits that can be borne by the PUCCH format 3/PUCCH format X for transmission of HARQ-ACK feedback information and the one or two PUCCH resources with the format different from the PUCCH format 2 for transmission of multiple periodic CSIs configured for the UE, the UE may select PUCCH resources with PUCCH formats that are enough to bear the UCI bits from the PUCCH format 3/PUCCH format X for transmission of HARQ-ACK feedback information and the one or two PUCCH resources with the format different from the PUCCH format 2 configured for the UE to transmit multiple periodic CSIs, and selects a PUCCH resource with a PUCCH format by which the largest number of bits that can be borne is the smallest from the selected PUCCH resources with the PUCCH formats to transmit UCI. If there are two PUCCH resources with the PUCCH formats selected, in which one is a new PUCCH resource configured for transmission of multiple periodic CSIs, and the other is a PUCCH resource for transmission of HARQ-ACK/SR information indicated by an ARI, then a method is to use the resource indicated by the ARI, and another method is to use the PUCCH resource for transmission of multiple periodic CSIs. When the number of the UCI bits to be transmitted in the subframe n is larger than the largest one of the largest numbers of bits that can be borne by the PUCCH format 3/PUCCH format X for transmission of HARQ-ACK feedback information and the one or two PUCCH resources with formats different from the PUCCH format 2 for transmission of multiple periodic CSIs configured for the UE, the UE selects a PUCCH resource with a PUCCH format by which the largest number of UCI bits that can be borne is the largest from the PUCCH format 3/PUCCH format X for transmission of HARQ-ACK feedback information and the one or two PUCCH resources with the formats different from the PUCCH format 2 for transmission of multiple periodic CSIs configured for the UE. If the largest number of bits that can be borne by the selected PUCCH resource is smaller than the number of the UCI bits to be transmitted, the UE drops all periodic CSI information or drops a part of periodic CSI information until the number of remaining UCI bits is smaller than or equal to the largest number of bits that can be borne by the selected PUCCH format, and transmits UCI with all or the part of periodic CSI information being dropped. If there are two PUCCH resources with PUCCH formats are selected, in which one is a PUCCH resource for transmission of multiple periodic CSIs, and the other is a PUCCH resource for transmission of HARQ-ACK/SR information indicated by the ARI, then one method is to use the PUCCH resource indicated by the ARI, and another method is to use the PUCCH resource for transmission of multiple periodic CSIs.

Method 3:

If the UE is configured with transmission of one or more periodic CSIs in the subframe n, then the UE uses the PUCCH format 3 resource for transmission of HARQ-ACK/SR information or the new PUCCH format X resource for transmission of HARQ-ACK/SR and periodic CSI information indicated by the ARI. When the number of UCI bits of all serving cells to be transmitted in the subframe n is smaller than or equal to a positive integer M (M is configured by higher layer signaling, or is preset based on a protocol, e.g., M is equal to 22) bits, the UCI bits are transmitted using the PUCCH format 3, and the ARI in a (an) (e)PDCCH for PDSCH scheduling indicates a corresponding PUCCH resource from a set of PUCCH format 3 resources configured for the UE by the higher layer signaling. When the number of the UCI bits of all the serving cells to be transmitted in the uplink subframe is larger than M (M is configured by higher layer signaling, or is preset based on a protocol, e.g., M is equal to 22) bits, the UCI bits are transmitted using the PUCCH format X, and the ARI in the (an) (e)PDCCH for PDSCH scheduling indicates a PUCCH resource from a set of PUCCH format X resources configured for the UE by higher layer signaling. When the largest number of bits that can be transmitted by the PUCCH resource indicated by the ARI is larger than the total number of the UCI bits, the PUCCH resource is used to transmit UCI; or otherwise, the UE drops all periodic CSI information or a part of periodic CSI information until the number of remaining UCI bits is smaller than or equal to the largest number of bits that can be borne by the selected PUCCH format, and uses the selected PUCCH resource to transmit UCI with all or the part of periodic CSI information being dropped.

Method 4:

When the UE is configure with transmission of one or more periodic CSIs in the subframe n, a method for determining the PUCCH format and the resource for transmission of PUCCH may be: selecting a PUCCH resource for transmission of periodic CSI according to the number of periodic CSI bits, and selecting the number of periodic CSI bits to be transmitted; using a sum of the number of periodic CSI bits and the number of HARQ-ACK/SR bits to be transmitted as the number of the UCI bits; and selecting a PUCCH resource from the PUCCH format 3 resource or the PUCCH format X resource for transmission of HARQ-ACK/SR information and PUCCH resources for transmission of periodic CSI to transmit the UCI.

Specifically, assume that the UE is configured with transmission of one or more periodic CSIs in the subframe n. First of all, the UE selects a PUCCH resource for transmission of periodic CSI according to the number of periodic CSI bits, and selects the number of periodic CSI bits to be transmitted. If there are two PUCCH resources for transmission of multiple periodic CSIs configured for the UE, the UE selects a PUCCH resource according to the total number of periodic CSI bits. A principle of selection is that when the largest numbers of bits that can be transmitted by the two PUCCH resources are both larger than the total number of periodic CSI bits, a PUCCH resource by which the largest number of bits that can be borne is smaller is selected, and the number of CSI bits to be transmitted is the number of all CSI bits; or otherwise, a PUCCH resource by which the largest number of bits that can be transmitted is larger is selected. If the largest number of bits that can be borne by the selected PUCCH resource is smaller than the number of UCI bits to be transmitted, the UE may drop all periodic CSI information, or drop a part of periodic CSI information until the number of remaining UCI bits is smaller than or equal to the largest number of UCI bits that can be borne by the selected PUCCH resource, and the number of periodic CSI bits to be transmitted is the number of CSI bits with all or the part of periodic CSI information being dropped. If only one PUCCH resource is configured for the UE to transmit multiple periodic CSIs, and if the largest number of bits that can be borne by the PUCCH resource is smaller than the number of UCI bits to be transmitted, the UE may drop all periodic CSI information, or drop a part of periodic CSI information until the number of remaining UCI bits is smaller than or equal to the largest number of bits that can be borne by the PUCCH format, and the number of periodic CSI bits to be transmitted is the number of periodic CSI bits with all or the part of CSI information being dropped. If only one PUCCH resource is configured for the UE to transmit multiple periodic CSIs, and if the largest number of bits that can be borne by the PUCCH resource is larger than or equal to the number of UCI bits to be transmitted, then the PUCCH resource is used to transmit the periodic CSI, and the number of periodic CSI bits is the number of all periodic CSI bits. Then the determined number of periodic CSI bits and HARQ-ACK/SR bits to be transmitted is used as the number of UCI bits, and the number of UCI bits used hereinafter refers to this. Then a PUCCH resource is selected from the PUCCH format 3 resource or the new PUCCH format X resource for transmission of HARQ-ACK/SR information indicated by the ARI and the selected PUCCH resource for transmission of periodic CSI according to the number of the UCI bits to transmit the UCI bits. A specific method of selection is that when the number of UCI bits that need to be transmitted in the subframe n is smaller than or equal to the largest value of the largest numbers of bits that can be borne by the PUCCH format 3/PUCCH format X for transmission of HARQ-ACK feedback information and the selected PUCCH resource for transmission of periodic CSI, the UE selects PUCCH resources that are enough to bear the UCI bits from the PUCCH format 3/PUCCH format X for transmission of HARQ-ACK feedback information and the PUCCH resource for transmission of periodic CSI, and selects a PUCCH resource by which the largest number of bits that can be borne is the smallest from the selected PUCCH resources to transmit UCI. If there are two PUCCH resources with the PUCCH formats selected, in which one is the selected PUCCH resource for transmission of periodic CSI, and the other is PUCCH resource for transmission of HARQ-ACK/SR information indicated by the ARI, then one method is to use the PUCCH resource indicated by the ARI, and the other method is to use the selected PUCCH resource for transmission of periodic CSI. When the number of UCI bits that need to be transmitted in the subframe n is larger than the largest value of the largest number of bits that can be borne by the PUCCH format 3/PUCCH format X for transmission of HARQ-ACK feedback information and the PUCCH resource for transmission of periodic CSI, the UE selects a PUCCH resource by which the largest number of UCI bits that can be borne is the largest from the PUCCH format 3/PUCCH format X for transmission of HARQ-ACK feedback information and the selected PUCCH resource for transmission of periodic CSI. If the largest number of bits that can be borne by the selected PUCCH resource is smaller than the number of UCI bits to be transmitted, the UE drops all periodic CSI information, or drops a part of periodic CSI information until the number of remaining UCI bits is smaller than or equal to the largest number of bits that can be borne by the selected PUCCH format, and uses this selected PUCCH to transmit UCI with all or the part of periodic CSI information being dropped. If there are two PUCCH resources with PUCCH formats selected, among which one is the selected PUCCH resource for transmission of periodic CSI, and the other is the PUCCH resource for transmission of HARQ-ACK/SR information indicated by the ARI, a method is to use the resource indicated by the ARI and another other method is to use the selected PUCCH resource for transmission of periodic CSI.

Figure 6:
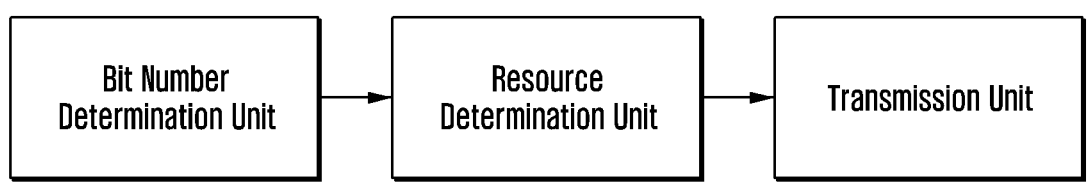
FIG. 6 is a schematic diagram of a basic structure of an apparatus for transmitting HARQ-ACK feedback information in an enhanced carrier aggregation system according to embodiments of the present disclosure.

The foregoing is detailed implementations of the method for transmission of HARQ-ACK according to the present disclosure. In addition, an apparatus for transmission of HARQ-ACK is provided according to the present disclosure, and can implement the foregoing methods. FIG. 6 is a schematic diagram of a basic structure of an apparatus for transmission of HAR-ACK according to the present disclosure. As shown in FIG. 6, the apparatus includes a bit number determination unit, a resource determination unit, and a transmission unit.

The bit number determination unit is configured to determine the number of HARQ-ACK feedback information bits that need to be transmitted by an UE in an uplink subframe; and determine the number of UCI bits to be transmitted in the uplink subframe based on the number of the HARQ-ACK feedback information bits, the number of CSI bits, and the number of SR bits that need to be transmitted in the uplink subframe.

The resource determination unit is configured to determine a PUCCH format and a resource for transmission of PUCCH according to the number of the UCI bits determined by the bit number determination unit.

The transmission unit is configured to transmit UCI according to the PUCCH format and the resource for transmission of PUCCH determined by the resource determination unit.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:
1. A method performed by a terminal in a wireless communication system, the method comprising:
receiving, from a base station, a control message configuring physical uplink control channel (PUCCH) resource sets including a first PUCCH resource set and a second PUCCH resource set, via a higher layer signaling, wherein each PUCCH resource set includes a plurality of PUCCH resources, and each PUCCH resource corresponds to a PUCCH format among a plurality of PUCCH formats, and wherein the control message includes a value indicating a maximum number of uplink control information (UCI) bits for a PUCCH resource set;

receiving, from the base station, downlink control information (DCI) including information indicating a PUCCH resource;

generating UCI including hybrid automatic repeat request acknowledgement (HARQ-ACK) information;

identifying whether the PUCCH resource indicated by the information corresponds to the first PUCCH resource set or the second PUCCH resource set, based on a number of bits of the UCI and the value indicating the maximum number of UCI bits, wherein the PUCCH resource corresponds to the first PUCCH resource set, in case that the number of bits of the UCI is more than the value, and wherein the PUCCH resource corresponds to the second PUCCH resource set, in case that the number of bits of the UCI is equal to or less than the value;

identifying, based on the information, the PUCCH resource for the UCI and a corresponding PUCCH format among the identified PUCCH resource set;

identifying whether second information indicating that the HARQ-ACK information and channel state information (CSI) are transmittable simultaneously on a same PUCCH resource is configured by the higher layer signaling; and in case that the second information is not configured by the higher layer signaling, dropping the CSI and transmitting, to the base station, the UCI including the HARQ-ACK information on the PUCCH resource based on the PUCCH format.

2. The method of claim 1,
wherein the DCI schedules a physical downlink shared channel (PDSCH) transmission, and
wherein the UCI further includes a scheduling request (SR).

3. The method of claim 1, wherein in case that the second information is configured by the higher layer signaling, the CSI and the HARQ-ACK information included in the UCI is transmitted on the PUCCH resource simultaneously.

4. A terminal in a wireless communication system, the terminal comprising:
a transceiver configured to transmit and receive a signal; and
a controller coupled with the transceiver and configured to:
receive, from a base station, a control message configuring physical uplink control channel (PUCCH) resource sets including a first PUCCH resource set and a second PUCCH resource set, via a higher layer signaling, wherein each PUCCH resource set includes a plurality of PUCCH resources, and each PUCCH resource corresponds to a PUCCH format among a plurality of PUCCH formats, and wherein the control message includes a value indicating a maximum number of uplink control information (UCI) bits for a PUCCH resource set,
receive, from the base station, downlink control information (DCI) including information indicating a PUCCH resource,
generate UCI including hybrid automatic repeat request acknowledgement (HARQ-ACK) information,
identify whether the PUCCH resource indicated by the information corresponds to the first PUCCH resource set or the second PUCCH resource set, based on a number of bits of the UCI and the value indicating the maximum number of UCI bits, wherein the PUCCH resource corresponds to the first PUCCH resource set, in case that the number of bits of the UCI is more than the value, and wherein the PUCCH resource corresponds to the second PUCCH resource set, in case that the number of bits of the UCI is equal to or less than the value,
identify, based on the information, the PUCCH resource for the UCI and a corresponding PUCCH format among the identified PUCCH resource set,
identify whether second information indicating that the HARQ-ACK information and channel state information (CSI) are transmittable simultaneously on a same PUCCH resource is configured by the higher layer signaling, and
in case that the second information is not configured by the higher layer signaling, drop the CSI and transmit, to the base station, the UCI including the HARQ-ACK information on the PUCCH resource based on the PUCCH format.

5. The terminal of claim 4,
wherein the DCI schedules a physical downlink shared channel (PDSCH) transmission, and
wherein the UCI further includes a scheduling request (SR).

6. A method performed by a base station in a wireless communication system, the method comprising:
transmitting, to a terminal, a control message configuring physical uplink control channel (PUCCH) resource sets including a first PUCCH resource set and a second PUCCH resource set, via a higher layer signaling, wherein each PUCCH resource set includes a plurality of PUCCH resources, and each PUCCH resource corresponds to a PUCCH format among a plurality of PUCCH formats, and wherein the control message includes a value indicating a maximum number of uplink control information (UCI) bits for a PUCCH resource set;
transmitting, to the terminal, downlink control information (DCI) including information for indicating a PUCCH resource; and
receiving, from the terminal, UCI including hybrid automatic repeat request acknowledgement (HARQ-ACK) information,
wherein whether the PUCCH resource indicated by the information corresponds the first PUCCH resource set or the second PUCCH resource set is identified based on a number of bits of the UCI and the value indicating the maximum number of UCI bits,
wherein the PUCCH resource corresponds to the first PUCCH resource set, in case that the number of bits of the UCI is more than the value,
wherein the PUCCH resource corresponds to the second PUCCH resource set, in case that the number of bits of the UCI is equal to or less than the value,
wherein the PUCCH resource for the UCI and a corresponding PUCCH format are identified among the identified PUCCH resource set, based on the information,
wherein the UCI is received on the PUCCH resource based on the PUCCH format, and wherein in case that second information indicating that the HARQ-ACK information and channel state information (CSI) are transmittable simultaneously on a same PUCCH resource is not configured by the higher layer signaling, the CSI is dropped and the UCI only includes the HARQ-ACK information.

7. The method of claim 6,
wherein the DCI schedules a physical downlink shared channel (PDSCH) transmission, and
wherein the UCI further includes a scheduling request (SR).

8. A base station in a wireless communication system, the base station comprising:
   a transceiver configured to transmit and receive a signal; and
   a controller coupled with the transceiver and configured to:
      transmit, to a terminal, a control message configuring physical uplink control channel (PUCCH) resource sets including a first PUCCH resource set and a second PUCCH resource set, via a higher layer signaling, wherein each PUCCH resource set includes a plurality of PUCCH resources, and each PUCCH resource corresponds to a PUCCH format among a plurality of PUCCH formats, and wherein the control message includes a value indicating a maximum number of uplink control information (UCI) bits for a PUCCH resource set,
      transmit, to the terminal, downlink control information (DCI) including information for indicating a PUCCH resource, and
      receive, from the terminal, UCI including hybrid automatic repeat request acknowledgement (HARQ-ACK) information,
wherein whether the PUCCH resource indicated by the information corresponds to the first PUCCH resource set or the second PUCCH resource set is identified based on a number of bits of the UCI and the value indicating the maximum number of UCI bits,
wherein the PUCCH resource corresponds to the first PUCCH resource set, in case that the number of bits of the UCI is more than the value,
wherein the PUCCH resource corresponds to the second PUCCH resource set, in case that the number of bits of the UCI is equal to or less than the value,
wherein the PUCCH resource for the UCI and a corresponding PUCCH format are identified among the identified PUCCH resource set, based on the information,
wherein the UCI is received on the PUCCH resource based on the PUCCH format, and
wherein in case that second information indicating that the HARQ-ACK information and channel state information (CSI) are transmittable simultaneously on a same PUCCH resource is not configured by the higher layer signaling, the CSI is dropped and the UCI only includes the HARQ-ACK information.

9. The base station of claim 8,
wherein the DCI schedules a physical downlink shared channel (PDSCH) transmission, and
wherein the UCI further includes or a scheduling request (SR).

* * * * *